United States Patent
Shilane et al.

(10) Patent No.: US 12,164,469 B2
(45) Date of Patent: Dec. 10, 2024

(54) DATA MIGRATION AND NAMESPACE MANAGEMENT ACROSS DOMAINS IN MULTI-DOMAIN CLUSTERED FILE SYSTEMS

(71) Applicant: Dell Products L.P., Round Rock, TX (US)

(72) Inventors: Philip Shilane, Newtown, PA (US); Chegu Vinod, San Jose, CA (US); George Mathew, Belmont, CA (US); Abhinav Duggal, Fremont, CA (US)

(73) Assignee: Dell Products L.P., Round Rock, TX (US)

( * ) Notice: Subject to any disclaimer, the term of this patent is extended or adjusted under 35 U.S.C. 154(b) by 28 days.

(21) Appl. No.: 18/161,002

(22) Filed: Jan. 27, 2023

(65) Prior Publication Data

US 2024/0256485 A1    Aug. 1, 2024

(51) Int. Cl.
  *G06F 16/11*    (2019.01)
  *G06F 16/16*    (2019.01)
  *G06F 16/174*   (2019.01)
  *G06F 16/182*   (2019.01)

(52) U.S. Cl.
  CPC ............ *G06F 16/119* (2019.01); *G06F 16/16* (2019.01); *G06F 16/1748* (2019.01); *G06F 16/182* (2019.01)

(58) Field of Classification Search
  CPC .... G06F 16/119; G06F 16/16; G06F 16/1748; G06F 16/182
  USPC .......................................................... 707/692
  See application file for complete search history.

(56) References Cited

U.S. PATENT DOCUMENTS

| | | | |
|---|---|---|---|
| 8,713,025 B2* | 4/2014 | Eder ...................... | G06F 16/951 707/711 |
| 10,303,797 B1* | 5/2019 | Menezes ............. | G06F 16/1727 |
| 10,990,518 B1* | 4/2021 | Wallace ................ | G06F 16/13 |
| 11,442,927 B1* | 9/2022 | Mamidi ................ | G06F 16/182 |
| 2018/0113643 A1* | 4/2018 | Hirsch .................. | G06F 3/0608 |
| 2020/0019468 A1* | 1/2020 | Chinnam ............. | G06F 11/1453 |
| 2020/0310964 A1* | 10/2020 | Lu ........................ | G06F 3/0604 |
| 2021/0232459 A1* | 7/2021 | Katiyar ................. | G06F 16/128 |
| 2021/0406230 A1* | 12/2021 | Truong ................ | G06F 11/1453 |
| 2022/0083513 A1* | 3/2022 | Wong ................... | G06F 16/1824 |
| 2022/0382644 A1* | 12/2022 | Yadav ................... | G06F 11/1448 |

* cited by examiner

*Primary Examiner* — Hicham Skhoun
(74) *Attorney, Agent, or Firm* — Staniford Tomita LLP

(57) ABSTRACT

Embodiments are described for migrating data and load balancing in a multi-domain network having a clustered network partitioned into a number of separate domains. Each domain contains resources like processors and memory, as well as deduplication and compression services. A single global namespace for the network is presented by combining all of the namespaces in the domains. A multi-domain manager component with an analytics engine facilitates analytics-driven migration of data among nodes in different domains, and a load balancer component monitors environmental operating conditions of each node in the clustered network, detects nodes having operating conditions exceeding defined tolerances, and migrates data and processes from nodes exceeding the defined tolerances to other nodes not exceeding the defined tolerances.

12 Claims, 14 Drawing Sheets

| Storage Tier | Tier ID |
|---|---|
| Tier A | 1 |
| Tier B | 2 |
| Tier C | 7 |
| Tier D | 3 |
| Tier E | 19 |
| Tier F | 21 |
| Tier G | 22 |

Tier ID Mapping Table per Domain

| Backup SLA | Tier list |
|---|---|
| SLA1 | 1,2 |
| SLA2 | 7 |
| SLA3 | <null> |
| SLA4 | 3 |

Backup_SLA Mapping for Domain A

1500

```
┌─────────────────────────────────────────────────────────────┐
│ FSRP receives a read request and inspects the Mtree ID in   │
│ the file handle to look up the domain                       │
│ 1502                                                        │
└─────────────────────────────────────────────────────────────┘
                              ↓
┌─────────────────────────────────────────────────────────────┐
│ FSRP and redirects client to AoB service in the Domain      │
│ 1504                                                        │
└─────────────────────────────────────────────────────────────┘
                              ↓
┌─────────────────────────────────────────────────────────────┐
│ Client forwards read request to the AoB node                │
│ 1506                                                        │
└─────────────────────────────────────────────────────────────┘
                              ↓
┌─────────────────────────────────────────────────────────────┐
│ AoB finds the L1 dataset for the offset being read          │
│ 1508                                                        │
└─────────────────────────────────────────────────────────────┘
                              ↓
┌─────────────────────────────────────────────────────────────┐
│ The AoB sends read request and tier_ID to node that owns    │
│ the similarity group                                        │
│ 1510                                                        │
└─────────────────────────────────────────────────────────────┘
                              ↓
┌─────────────────────────────────────────────────────────────┐
│ Backend node checks KV store for similarity group and       │
│ tier_ID to determine object to read from object storage     │
│ 1512                                                        │
└─────────────────────────────────────────────────────────────┘
```

FIG. 15

DATA MIGRATION AND NAMESPACE MANAGEMENT ACROSS DOMAINS IN MULTI-DOMAIN CLUSTERED FILE SYSTEMS

TECHNICAL FIELD

Embodiments are generally directed to distributed networks, and specifically to providing a multi-domain and multi-tier architecture for distributed file systems to minimize the impact of system failures to the files within a domain.

BACKGROUND

A distributed file system is a type of file system in which data is spread across multiple storage devices as may be provided in a cluster of nodes. Clustered network systems represent a scale-out solution to single node systems by providing networked computers that work together so that they essentially form a single system. Each computer forms a node in the system and runs its own instance of an operating system. The cluster itself has each node set to perform the same task that is controlled and scheduled by software. In this type of network, the file system is shared by being simultaneously mounted on multiple servers. The distributed file system can present a global namespace to clients (nodes) in a cluster accessing the data so that files appear to be in the same central location. Distributed file systems are typically very large and may contain many hundreds of thousands or even many millions of files, as well as services (applications) that use and produce data.

The Santorini file system is a type of clustered system that stores the file system metadata on a distributed key value store and the file data on object store. The file/namespace metadata can be accessed by any front end node, and any file can be opened for read/write by any front end node.

The Santorini file system is configured for a FTT (Failures to Tolerate) of two nodes or two drives per node. If the number of failures is beyond the FTT that the network can handle, there could be a data unavailability situation. This can be because more than two nodes (or two disks) fail causing the underlying object store to have a data error, the key-value store loses the file system metadata, or the data in the distributed log gets lost. As the number of nodes in the cluster grows, the chances of multiple nodes or drives failing or seeing a network partition increases. Any such failure can cause a data/metadata access to fail, which will ultimately lead to unavailability of some data in the system. Besides delayed backups and restores, there is a cost in iterating the file system and identifying the files affected by the data unavailability while correcting the problem. As the file system size grows, the cost of iterating the file system to identify any affected objects also grows. For example, for a 1PB system, losing two drives or nodes would result in iterating all the files throughout the 1PB of data to find files that are affected. Also, the data loss can affect the whole file system. The namespace directory tree (Btree) and the duplicate root metadata can be lost because of the data error. Moreover, the list of possible errors that can cause a data loss is lengthy.

To address this issue, some systems create multiple domains, while others choose to mitigate this issue by limiting the cluster size and creating multiple clusters. However, such solutions involve creating and managing multiple Kubernetes clusters to deploy the clustered network software. They also present the user with multiple clusters.

What is needed, therefore, is a multi-domain architecture for a clustered network that maintains the user view of the network as a single cluster while limiting the impact of multiple failures.

Each domain can also provide different classes of storage, in different storage 'tiers,' with device types to provide different cost and performance characteristics, such as hard disk versus solid-state disk drives. Present clustered network systems do not fully leverage the cost/benefit balance of tiered storage for deduplication backup applications.

What is further needed, therefore, is a multi-tier architecture that supports files spanning multiple storage device levels to provide optimal deduplication performance and maintain service level agreement (SLA) requirements.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. Dell and EMC are trademarks of Dell/EMC Corporation.

BRIEF DESCRIPTION OF THE DRAWINGS

In the following drawings like reference numerals designate like structural elements.

Although the figures depict various examples, the one or more embodiments and implementations described herein are not limited to the examples depicted in the figures.

FIG. 15 is a flowchart that illustrates a method of performing data deduplication by tracking tier placement per L1 entry for a read operation, under some embodiments.

DETAILED DESCRIPTION

Figure 1:
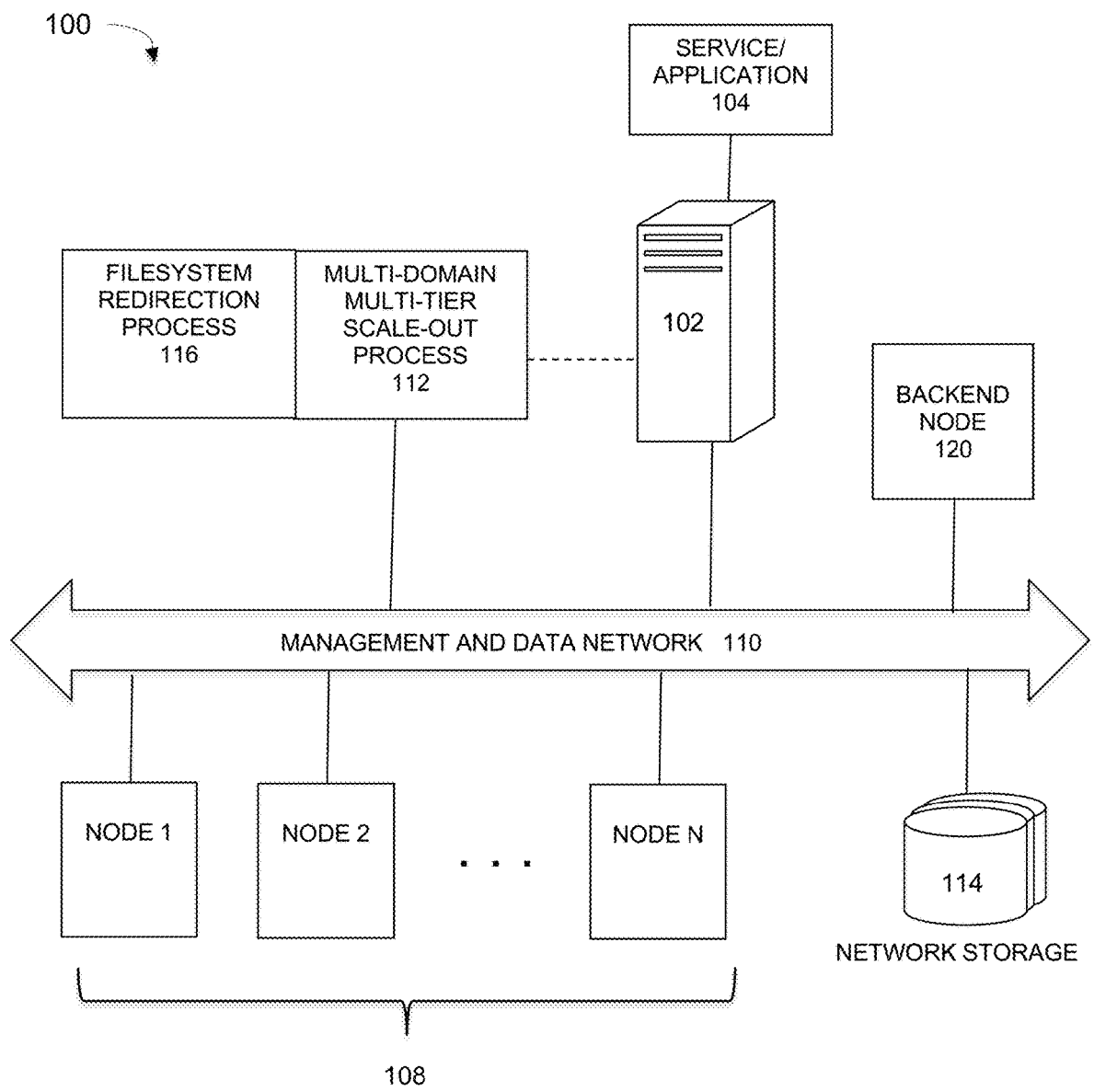
FIG. 1 is a block diagram of illustrating a distributed system implementing a multi-domain, multi-tier scale-out architecture, under some embodiments.

A detailed description of one or more embodiments is provided below along with accompanying figures that illustrate the principles of the described embodiments. While aspects of the invention are described in conjunction with such embodiments, it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. In this specification, these implementations, or any other form that the invention may take, may be referred to as techniques. In general, the order of the steps of disclosed processes may be altered within the scope of the described embodiments.

Embodiments are directed to a multi-domain and multi-tier architecture for clustered network file systems (e.g., Santorini). This architecture facilitates the creation and use of sub-clusters, called domains, where the resources in a domain are allocated only from the nodes in the domain. This helps limit the impact of system failures to the files within a domain. A file system redirection service manages a global namespace spanning the domains and redirects file accesses to the appropriate domain where it is stored. Each domain can have different tiers offering different classes of storage to balance cost and performance characteristics.

FIG. 1 is a block diagram of illustrating a distributed system implementing a multi-domain, multi-tier system and architecture, under some embodiments. System 100 comprises a large-scale network that includes a number of different devices, such as server or client computers 102, nodes 108, storage devices 114, and other similar devices or computing resources. Other networks may be included in system 100 including local area network (LAN) or cloud networks, and virtual machine (VM) storage or VM clusters. These devices and network resources may be connected to a central network, such as a data and management network 110 that itself may contain a number of different computing resources (e.g., computers, interface devices, and so on). FIG. 1 is intended to be an example of a representative system implementing a distributed computing system under some embodiments, and many other topographies and combinations of network elements are also possible.

A distributed system (also referred to as a cluster or clustered system) typically consists of various components (and processes) that run in different computer systems (also called nodes) that are connected to each other. These components communicate with each other over the network via messages and based on the message content, they perform certain acts like reading data from the disk into memory, writing data stored in memory to the disk, perform some computation (CPU), sending another network message to the same or a different set of components and so on. These acts, also called component actions, when executed in time order (by the associated component) in a distributed system would constitute a distributed operation.

A distributed system may comprise any practical number of compute nodes 108. For system 100, n nodes 108 denoted Node 1 to Node N are coupled to each other and computer 102 through network 110. Theses client compute nodes may include installed agents or other resources to process the data of application 104. The application at the server 102 communicates with the nodes via the control path of network 110 and coordinates with certain agent processes at each of the nodes 108 to perform application functions of the distributed file system.

The network 110 generally provide connectivity to the various systems, components, and may be implemented using protocols such as Transmission Control Protocol (TCP) and/or Internet Protocol (IP), well known in the relevant arts. In a cloud computing environment, the applications, servers and data are maintained and provided through a centralized cloud computing platform.

For the example network environment 100 of FIG. 1, server 102 is an application server that executes one or more applications or processes 104 that processes data in the system using one or more nodes 108. One typical application is a data backup management application that coordinates or manages the backup of data from one or more data sources, such as other servers/clients to storage devices, such as network storage 114 and/or virtual storage devices, or other data centers. The data generated or sourced by system 100 may be stored in any number of persistent storage locations and devices, such as local client or server storage. The storage devices represent protection storage devices that serve to protect the system data through applications 104, such as a backup process that facilitates the backup of this data to the storage devices of the network, such as network storage 114, which may at least be partially implemented through storage device arrays, such as RAID (redundant array of independent disks) components.

In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays for use by a backup server, such as a server that may be running Networker or Avamar data protection software backing up to Data Domain protection storage, such as provided by Dell/EMC™ Corporation.

As shown in FIG. 1, system 100 includes a service scaling process 112 that is executed by the system to manage the multi-domain, multi-tier scale-out of the system. As shown in FIG. 1, process 112 may be a process executed by a specialized node as a specially configured management or control node in system 100. Alternatively, it may be executed as a server process, such as by server 102 or any other server or client computer in the system. The service scaling process 112 works with the other components of the distributed system and may use certain services or agents that run on each compute node 108 in the distributed system, such as may be implemented as a daemon process running in each node. As understood, a daemon is a computer program that runs as a background process, rather than being under the direct control of an interactive user.

The multi-domain architecture allows a user to create sub-clusters of physical nodes, called domains, and file system resources for the data placed in a domain are allocated only from the nodes in the domain. This helps limit the impact of system failures to specific domains. A file system redirection service 116 manages a global namespace spanning the domains and redirects file accesses to the appropriate domain where it is stored. In each domain, there are different classes of storage, called tiers, with different cost and performance characteristics. Files can be placed on a set of tiers depending on a storage level agreement (SLA) specified for a file. Tier examples include a higher performance tier consisting of solid-state disk (SSDs) and a lower performance tier of hard disk drives (HDDs), or other similar storage device types.

In an embodiment, system 100 uses Kubernetes as an orchestration framework for clustering the nodes 1 to N in FIG. 1. Application containerization is an operating system level virtualization method for deploying and running distributed applications without launching an entire VM for each application. Instead, multiple isolated systems are run on a single control host and access a single kernel. The application containers hold the components such as files, environment variables and libraries necessary to run the desired software to place less strain on the overall resources available. Containerization technology involves encapsulating an application in a container with its own operating environment, and the well-established Docker program deploys containers as portable, self-sufficient structures that can run on everything from physical computers to VMs, bare-metal servers, cloud clusters, and so on. The Kubernetes system manages containerized applications in a clustered environment to help manage related, distributed components across varied infrastructures. Certain applications, such as multi-sharded databases running in a Kubernetes cluster, spread data over many volumes that are accessed by multiple cluster nodes in parallel.

In an embodiment, the multi-domain, multi-tier process 112 is used in a clustered network that implements Kubernetes clusters. One such example network is the Santorini system or architecture, though other similar systems are also possible.

Figure 2:
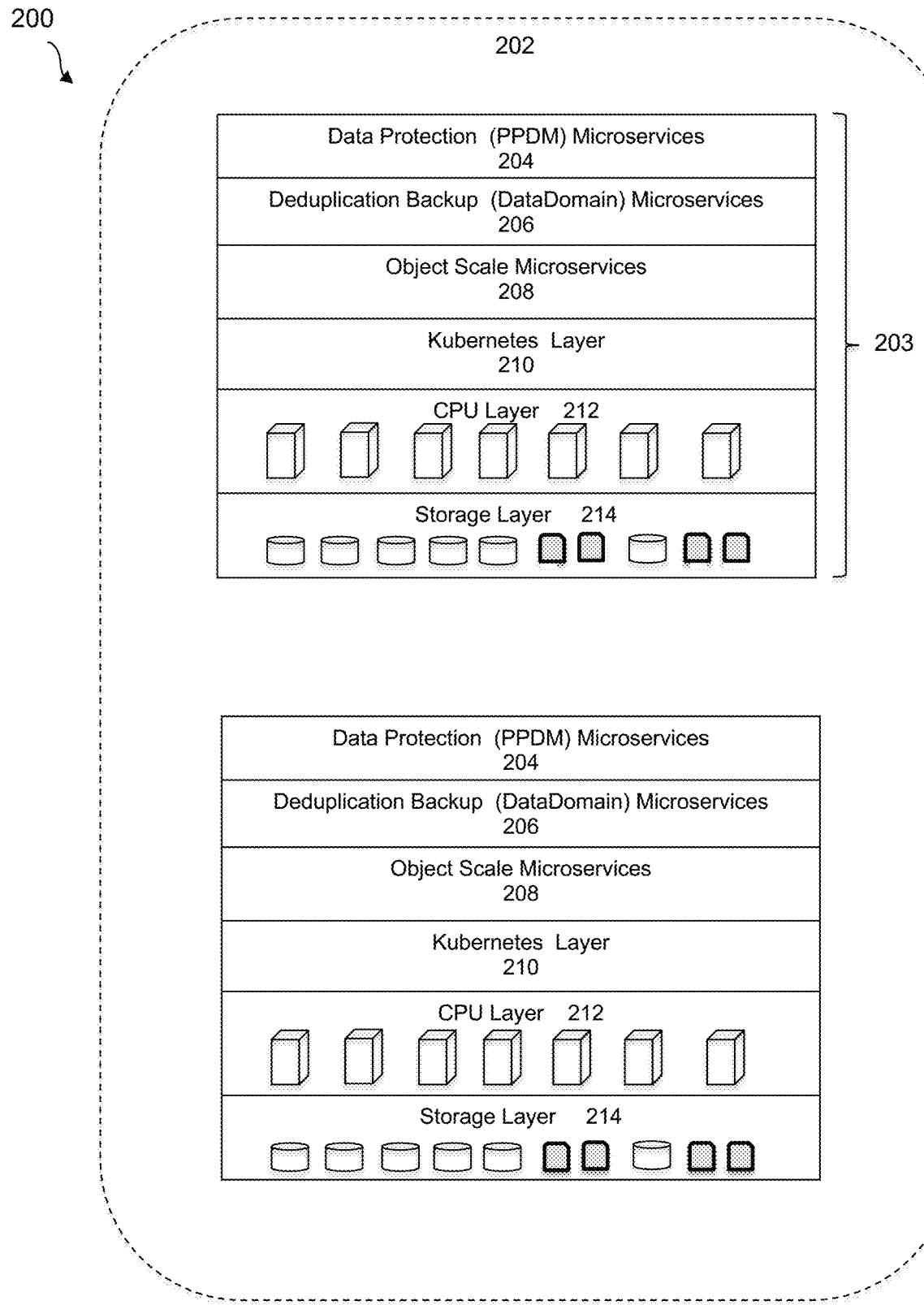
FIG. 2 illustrates a high-level overview of a network cluster using the Santorini architecture, under some embodiments.

FIG. 2 illustrates a high-level overview of a network cluster using the Santorini architecture, under some embodiments. In system 200 of FIG. 2, a two-node cluster 202 is shown. Each node 203 consists of several distinct components or processing layers. For the example shown, a node includes a PowerProtect Data Manager (PPDM), or similar microservices layer 203, a Data Domain (deduplication backup) appliance microservices layer 206, an object scale microservices layer 208, a Kubernetes layer 210, a processor layer 212, and a storage layer 214 including different types of storage media, such as HDD, Flash memory, SSD memory, and so on. Each of these component products consists of multiple microservices, and as more nodes are added, Santorini scales CPU, storage, RAM, and networking accordingly. Other layers can also be included, and a cluster 202 may comprise any practical number of nodes 203.

As shown in FIG. 2, embodiments of the cluster network 200 through DD microservices 206 utilize Data Domain backup appliances to provide streaming deduplication, and which use the Data Domain File System (DDFS) as an inline data deduplication filesystem. As data gets written to the filesystem, DDFS breaks it into variable sized segments and a group of segments are packed in a compression region. A number of compression regions are grouped together and written as a container to disk. DDFS calculates fingerprint signatures for each segment using SHA1 algorithm. DDFS has an on-disk fingerprint index table, which maps the fingerprint to the container-ID, that has the corresponding segment data. The container has a metadata section followed by several data sections. The data sections store the compression regions; and the container metadata section stores the meta information of the container, i.e., it stores the total number of compression regions, the total number of segments, the fingerprint of each segment, and so on.

In a deduplicated filesystem that forms segments from data, these segments are uniquely identified by their key/label called a 'fingerprint.' Given a file offset and length, the corresponding data segment fingerprints need to be looked up. To provide faster offset to fingerprint lookup the mapping is stored in a Merkle tree format where the leaf nodes represent data segments and their fingerprints are stored in the parent nodes which are metadata segments. In a Merkle tree, every non-leaf node is labeled with the hash of the labels of its children nodes to allow efficient and secure verification of the contents of large data structures.

A file in DDFS is represented by a Merkle tree with user data as variable sized segments at the bottom level of the tree, referred to as L0 segments. The SHA1 fingerprints of those segments are grouped together at the next higher level of the tree to form new segments, referred to as L1 segments. SHA1 fingerprints of L1 segments are grouped together as L2 segments, and this continues up to L6 which represents the entire file. The top segment of the tree is always an L6 segment, even though it may refer to any lower numbered segments. Segments above L0 are referred to as Lp chunks. The L6 segment of every file is stored in a namespace which is represented as a B+ Tree. The L0 and Lp segments are written to separate containers, known as L0 and Lp containers.

A Data Domain or similar system can efficiently copy an existing file using the same underlying Merkle tree. It creates the new file with a new name, and therefore a new $L_6$ root of the tree, but that tree then references the identical $L_P$ chunks. As this operation involves only the root of the tree, it is trivially fast and does not increase physical space in use beyond the one chunk containing the $L_6$.

In an embodiment, the PPDM (PowerProtect Data Manager) microservices layer 204 builds on the Data Domain system 206 to provide data protection capabilities for VM image backups and Kubernetes workloads.

Figure 3:
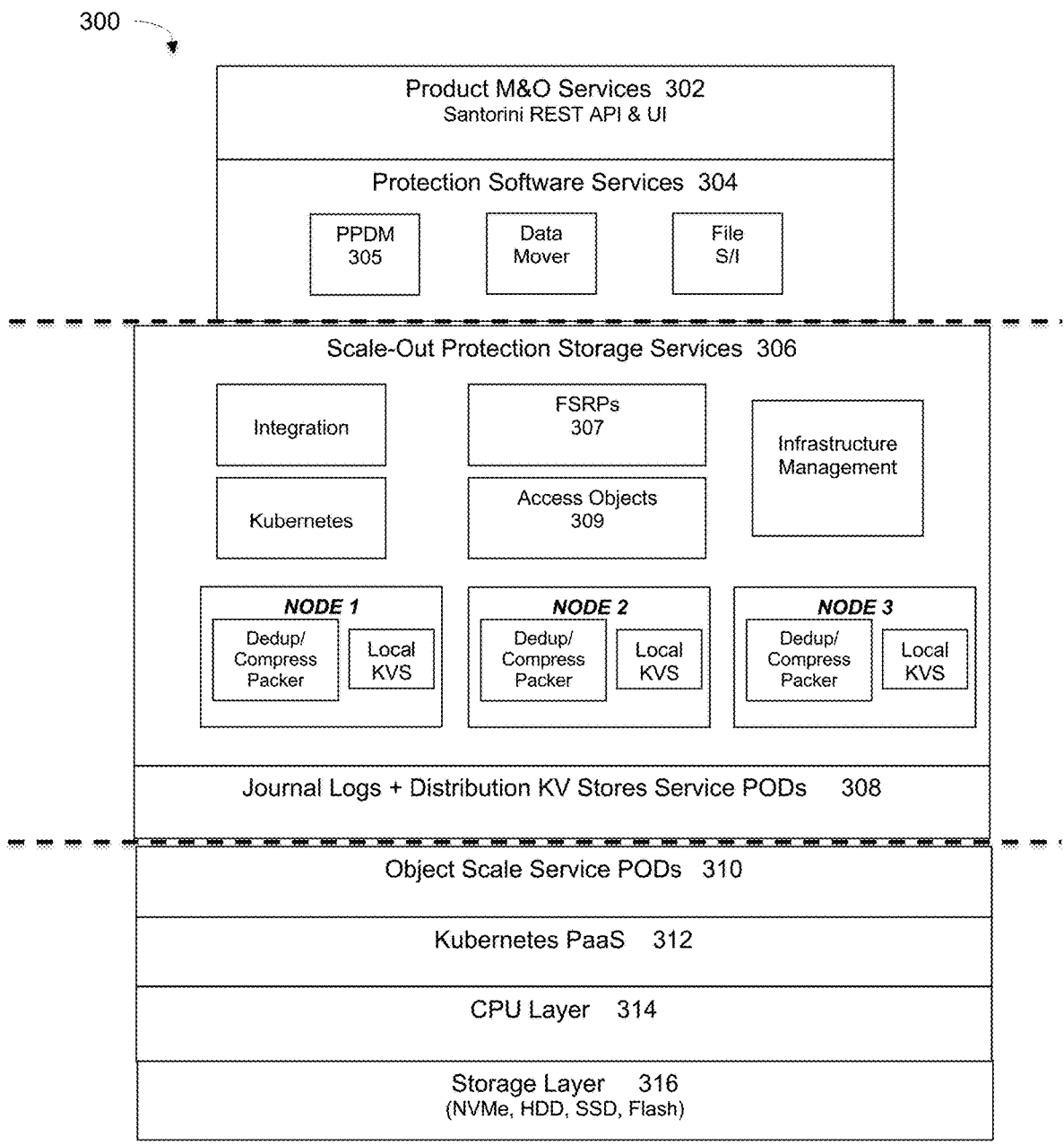
FIG. 3 illustrates details of the services related to the data path running in Santorini cluster network, under some embodiments.

FIG. 3 illustrates details of the services related to the data path running in Santorini cluster network, under some embodiments. As shown in diagram 300, a product services layer 302 provides the necessary REST APIs and user interface utilities. The API server implements a RESTful interface, allowing many different tools and libraries can readily communicate with it. A client called kubecfg is packaged along with the server-side tools and can be used from a local computer to interact with the Kubernetes cluster.

Below layer 302, the protection software services layer 304 includes the a data manager (e.g., Power Protect Data Manager, PPDM) component 305 that provides backup software functionality. Within the scale-out protection storage services layer 306, the File System Redirection Proxy (FSRP) service 307 redirects file operations in a consistent manner based on the hash of a file handle, path, or other properties to instance of the access object service 309. The access object service 309 handles protocols and a content store manager. This means that files are segmented and the Lp tree is constructed by an access object 309. The FSRP 307 redirects file system accesses in a consistent way to the access objects 309 so that any in-memory state can be reused if a file is accessed repeatedly in a short time, and it avoids taking global locks.

Also included in this layer 306 are any number of nodes (e.g., Nodes 1 to 3, as shown), each containing a dedup/compression packer and a key-value (KV) store.

As an L1 is formed, a similarity group is calculated for the L1 based on the SHA1 fingerprints of the L0 segments (or other properties). The similarity group is checked against a mapping table, which leads to consistently routing the L1 based on its similarity group to an instance of a node's dedup/compress service. If similarity groups are in a range of 0-1023, then if there are four instances of the dedup/compress service, then the instances may uniquely be responsible for the ranges 0-255, 256-511, 512-767, 768-1023, though other mappings are possible. The dedup/compress instance will deduplicate the L0 segments relative to other fingerprints within the same similarity group. Other functionality exists in the dedup/compress service such as packing segments into compression regions, containers, and blobs that will be written to an underlying object storage such as provided by the object scale service layer 301, or an object store provided by the public cloud.

Distributed key value stores are also a component of Santorini and are used to hold much of the metadata such as the namespace Btree, the Lp tree, fingerprint index, and container fingerprints. These run as containers within the Santorini cluster and are stored to low latency media such as NVMe. There is also a distributed and durable log that replaces NVRAM for Santorini.

Multi-Domain Support

As mentioned above, the Santorini file system is configured for a FTT (Failures to Tolerate) of two nodes or two drives per node. If the number of failures exceeds this FTT, data could be rendered unavailable. As a system scales, the chance of such failure increases accordingly. As an alternative to simplistic methods such as limiting cluster size or creating multiple clusters, embodiments implement a multi-domain, multi-tier architecture to maintain a user view of the clustered network as a single cluster, while limiting the impact of multiple failures.

In an embodiment, process 112 partitions a larger cluster into sub-partitions called domains. The user's namespaces (Mtrees) are distributed across multiple domains (each Mtree exists in only a single domain), and file system resources are partitioned by domain. An unavailability of one domain will thus only affect files placed in that domain. This reduces the span of files affected by a system unavailability.

Domains can also be used to provide physical isolation between data such as different areas of a data center with separate networking and power. Domains are created by the user from a collection of nodes in the cluster. A node can only be part of one domain in a system.

Figure 4:
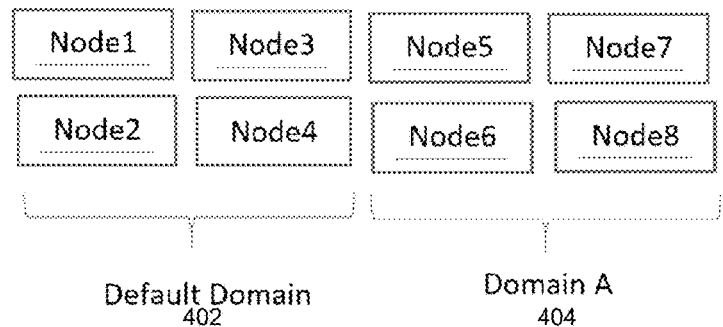
FIG. 4 illustrates an organization of nodes into multiple domains, under some embodiments.

FIG. 4 illustrates an organization of nodes into multiple domains in a Santorini clustered network, under some embodiments. As shown in FIG. 4, four nodes (denoted Node1 to Node4) are organized into a first domain 402, and another four nodes (denoted Node5 to Node8) are organized into a second domain 404. The Santorini file system is always initialized with one domain referred to as the 'default domain.' Users can create more domains and add nodes as desired to these domains.

With respect to the directory tree structure of the data processed in system 100, various different data structures can be supported by the file system (e.g., DDFS or Santorini filesystem). A B+ Tree is self-balancing tree structure and is a variant of a standard B Tree, and Each file inode is stored in the B+ Tree as a data blob using the parent directory inode number and the child file inode number as the key. A B+ Tree key structure composed of the parent directory inode as the primary key and child file inode as the secondary key to construct the full key. An Mtree is a tree data structure similar to a B+ Tree (or R-tree), which is constructed using a metric and relies on triangle inequality for efficient range and k-nearest neighbor queries. As with other tree-based data structures, the Mtree is composed of nodes and leaves. In each node there is a data object that identifies it uniquely and a pointer to a sub-tree where its children reside. Every leaf has several data objects FIG. 4 illustrates an eight-node cluster where Nodes 1 to 4 are in the default domain and Nodes 5 to 8 are in Domain A. Note that Nodes 1-4 are separate from Nodes 5-8 and should have independent resources to maintain the desired characteristics of domains. Each domain has sufficient hardware and services running to maintain its namespace availability. Within Data Domain, each domain has its own Utree that lists the Mtrees placed in that domain. Other services run in a global namespace across all domains. In an embodiment, a Utree (Umbrella tree) is a tree that contains one or more Mtrees and/or B+trees, and an Mtree is a Managed tree or Modified Btree of a filesystem. Generally, an Mtree is a logical partition of the namespace in the file system that can group together a set of files for management purposes; for example, snapshot schedules, replication, or retention locking. The directory manager component of DDFS represents the namespace using B+trees. Mtrees and their snapshots are B+trees, and they in turn are referenced from a parent B+tree or 'Utree.'

Namespaces (Mtrees) are bound to domains. Upon creation of an Mtree, an optional argument identifies the domain on which the Mtree is created. All namespace metadata as well as the file data and metadata associated with a Mtree is allocated from resources owned by that domain. The Mtree names as well as Mtree IDs are unique across the cluster. Santorini exposes a global namespace that is a union of all namespaces in all domains. For example, if domain 1 had Mtree1 and Mtree2 and domain 2 had Mtree3, the Santorini cluster will expose the namespace/data/col1/Mtree1, /dat/col1/Mtree2 and /data/col1/Mtree3.

In general, Mtree names and IDs need to be unique so that it is clear where writes and reads should be directed. This also allows Mtrees to potentially be migrated from one domain to another within the cluster without dealing with name collisions. The Mtree metadata and the file data needs to be copied from the source domain to the destination domain and then removed from the source domain. An Mtree can only be accessed through one domain at a time. An Mtree or some of its files could also be replicated to a second domain if a user so desires. In this case, there are two separate Mtrees, one on the source and another on the destination, and files or the complete Mtree are replicated from the source to destination. This provides an extra level of data protection and availability for critical data.

A Santorini system keeps cluster-wide metadata that maps an Mtree to a domain and nodes to the domain. A cluster wide service called the File System Redirection Proxy (FSRP) can redirect a client request (e.g., a DDBOOST client) to the correct access object (AoB) in the domain. The FSRP can extract the Mtree ID (MID) from the protocol request, map the MID to the domain, and redirect the client to one of the access object services running in the nodes of the domain. In this case, the unified namespace is exposed by the FSRP and clients are redirected, per file, to the services in a domain that serves the Mtree.

The FSRP service spans domains so that a global namespace is presented to the users, and any access (write/read) can be directed to the appropriate domain. Since failures to the FSRP could impact data availability, the FSRP services has multiple instances and uses resources from more than one domain in the cluster so it can survive a domain failure.

Figure 5:
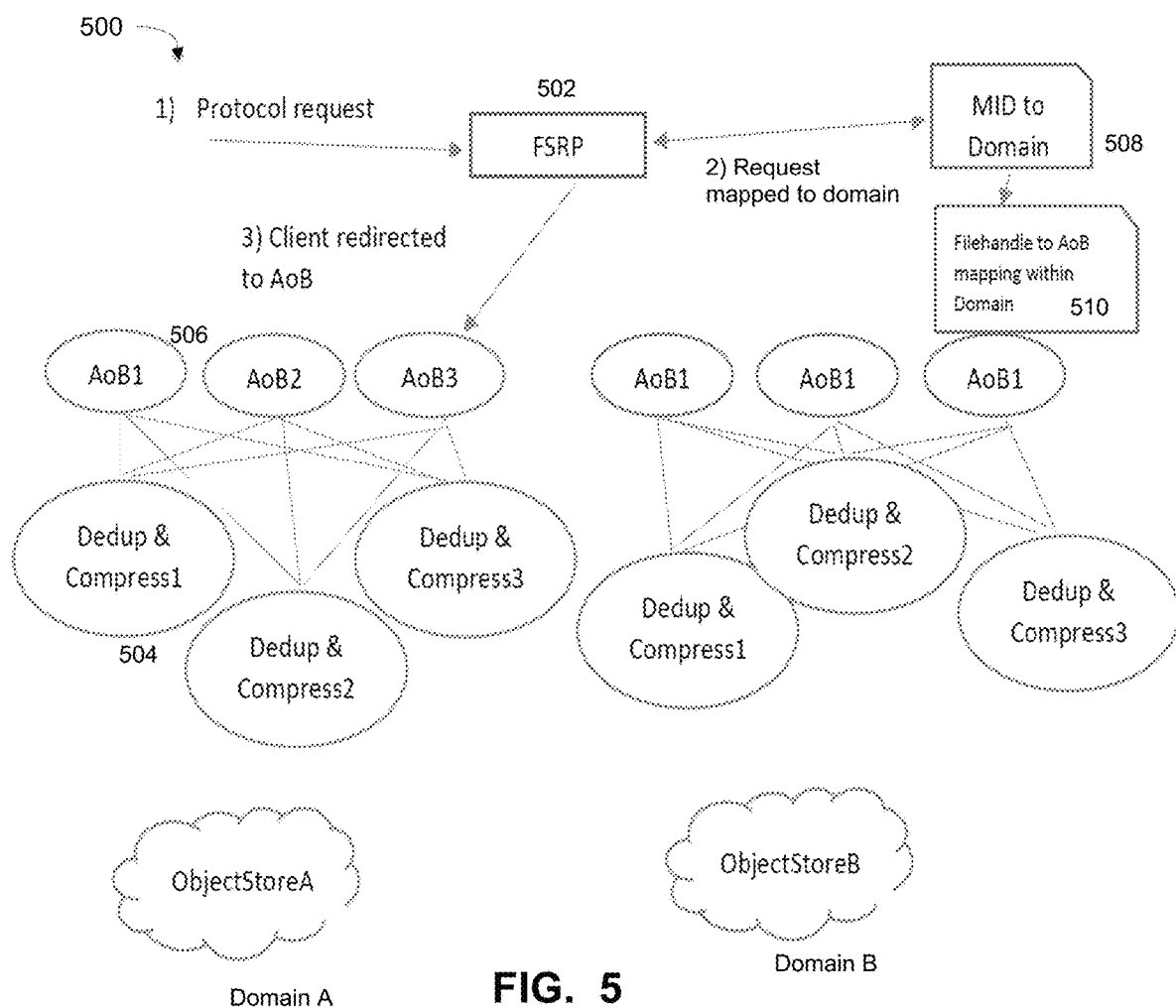
FIG. 5 illustrates an example mapping of Mtrees to domains in a Santorini system, under some embodiments.

FIG. 5 illustrates an example mapping of Mtrees to domains in a Santorini system, under some embodiments. As shown in FIG. 5, system 500 includes two domains denoted Domain A and Domain B, each having a respective Object Store. The FSRP service 502 has multiple instances located in both Domain A and Domain B in this example.

Each domain has a set of Dedup and Compress services 504. Each domain has a set of similarity groups that are distributed among the Dedup and Compress services. For an ingest, the AoB service 506 finds the similarity group for an L1 and sends the L1 data to the Dedup and Compress service in that domain that owns the similarity group. Each domain has a set of object stores that are allocated from the nodes in that domain. The Dedup and Compress 504 service packs the unique segments of an L1 and writes it as an object in the object store in that domain.

Each domain has an associated set of resources like CPU, memory, storage pools, and key value stores. The resource consumption is tracked per domain. As an example, CPU or memory consumption per domain will be tracked by the system. Space alerts will be generated per domain if the corresponding domain's free space falls under a defined threshold (low water mark). While more resources can be added to a domain by allocating a node and adding it to the domain, a domain cannot use resources already allocated to another domain, since that would break the independence properties. In an embodiment, the Santorini system is designed to have a specified FTT value, so each domain needs sufficient resources to provide that level of availability and would have a minimum configuration size. For example, if there are 3-5 nodes, the FTT may be set to 1, and if there are greater than 6 nodes, the FTT may be set to 2, etc. With each level of node numbers, the system creates sufficient copies of data and metadata structures to handle that many simultaneous failures.

In general, domains are not allowed to be created with insufficient resources (i.e., not enough nodes, network switches, etc.). Once a domain is created and in use, if resources become unavailable, the files in that domain are temporarily unavailable until the system is repaired, so there is a potential data loss if there are too many simultaneous failures of the storage media.

For the embodiment of FIG. 5, a protocol request (1) comes into FSRP service 502. This request is mapped to a domain (2). The process generates a unique MID for the Mtree in a Domain 508, and forwards or redirects (3) the Mtree create request, along with the MID to an AoB service in the associated domain through the file handle to AoB mapping 510.

Operations like Mtree create, will have an optional argument that specifies which domain the Mtree should be created within. If the domain argument is not specified, the operation will be done on the default domain. The system manager component, once it receives the Mtree create operation, verifies that the Mtree name is unique, generates a unique MID for the Mtree and forwards the Mtree create request, along with the MID to an AoB service in the associated domain.

In some cases there are cluster-wide metadata elements that do not belong to any specific domain, like Kubernetes Etcd, metadata describing the list of domains, and so on. This has to be replicated across the domains to provide availability.

Multi-Tier Support

As shown in FIG. 2, the storage layers 214 of each node can include different types of storage media. These media devices provide different levels of performance and capacity based on cost and availability. For example, HDD storage is typically large and cheap, but relatively slow, while SSD storage is fast but expensive and limited in capacity. Certain users may wish to accelerate write/reads of certain workloads or alternatively lower the cost of storage with the tradeoff of increased latency and lower throughput. Embodiments of system 200 provide different tiers of storage, allowing a user to select where to place their data based on their business requirements, where each tier represents a different type or class of storage media based on these characteristics.

In an embodiment, the Santorini clustered system is architected so that each domain can have multiple storage tiers. Each storage tier can meet certain service level objectives (SLO) such as latency, throughput, and cost. While a variety of storage tiers are possible, in most systems, the likely storage tiers are Flash, HDD, and a remote object store that likely uses HDDs. It is also possible to adjust the RAID configuration to control resilience to failures, which leads to different storage space overheads. For example, Domain A in FIG. 5 can have storage tier1 which is allocated from a set of high performance NVME devices, storage tier 2 that is allocated from RAID 6 with 10 data columns and 4 parity columns, storage tier 3 that is a RAID 6 volume with 10 data columns and 2 parity columns, and storage tier 4 that is configured from external cloud storage. This is mentioned for purposes of example only, and other systems may have different storage device configurations.

Figures 6, 7, 8:
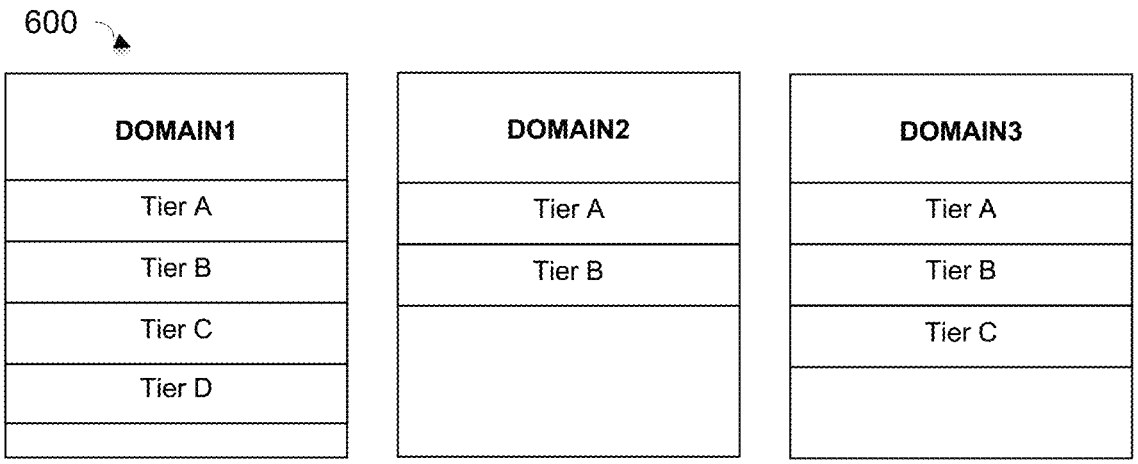
FIG. 6 is a diagram that illustrates the organization of different tiers in different domains, under some embodiments.
FIG. 7 is a table that illustrates an example tier ID to storage tier mapping table per domain, under an example embodiment.
FIG. 8 is a table that illustrates an example backup service level agreement (SLA) to tier ID mapping table, under an example embodiment.

FIG. 6 is a diagram that illustrates the organization of different tiers in different domains, under some embodiments. Diagram 600 shows three example domains (Domain1, Domain2, and Domain3) each having a certain number of storage tiers (Tier A, Tier B, Tier C, and so on). Each domain may have any appropriate number of tiers, and different domains may have different numbers of storage tiers. Although FIG. 6 shows domains differentiated by number, i.e., 1, 2, 3, etc., and tiers differentiated by letter, i.e., A, B, C, etc., it should be noted that any variable can be used to differentiate individual domains and tiers, such as letters, numbers, roman numerals, and so on. The tier indicators (e.g., A, B, C) generally indicate storage media types or characteristics rather than actual specific devices. Thus, tier A may be a standard tier with HDDs used for data, tier B may be a remote cloud tier, and so on.

Each storage tier is associated with a backup service level agreement (Backup_SLA). Files can have an SLA attribute that shows in which storage tier the file data should be kept. The storage tier is mapped to a backup_SLA when the storage tier is created in a domain. As in the previous example, storage tier 1 is associated with Backup_SLA "performance," storage tier 2 is associated with "high availability," and storage tier 3 is associated with "regular backup SLAs." A tier can be present only in one backup_SLA.

Each file can have a lifecycle where it is migrated from one tier to another as it ages based on the SLA associated with that file or the backup set itself. This is managed from the backup software, such as PPDM. A file may start on a performance tier in case a recent backup needs to be accessed or restored. As time passes and more backups are created, it is less likely to be needed again, so a policy may migrate it to a regular backup tier for longer term preservation at lower media cost.

In an embodiment, the Santorini systems supports multiple storage tiers in the same backup_SLA. This would be needed as multiple storage tiers might be created because of device characteristics (NVME, SSD, HDD, etc.), different availability characteristics (10+2 RAID, 10+4 RAID, etc.) or because of enclosure boundaries (storage from external ECS1 or external ECS2, etc.) and the number of storage tiers could be more than the number of backup_SLAs consumed by the backup application. On an integrated product that has both backup software and storage, we could restrict the number of storage tiers supported to be the same as the number of backup_SLAs as we have tighter control on both the backup application and the storage subsystem.

The system also supports having multiple storage tiers in a backup_SLA and having the ability for a file to span the storage tiers and support deduplication across storage tiers. An initial implementation of the integrated solution can be simplified by having only one storage tier in a backup_SLA.

Each domain has a default tier, if a domain does not have backup_SLA mapping to a tier, the file will be placed in the default tier. Similarly, if the file does not have a backup_SLA, the file will be placed in the default tier.

Each storage tier in the file system is assigned an integer value 'tier_ID.' These values are global in the Santorini cluster, across all domains. FIG. 7 is a table that illustrates an example tier ID to storage tier mapping table per domain, under an example embodiment. The example table 702 illustrates the possible tier IDs mapped to storage tiers A to G.

The backup_SLA definitions are across domains. For each domain, a backup_SLA to tier_ID mapping table is kept that gives the tier_ID list for the backup_SLA for that domain. This gives us a system-wide mapping table of storage tier to tier id and a per domain mapping of a backup_SLA to a tier IDs. Table 802 of FIG. 8 illustrates an example backup_SLA to tier_ID mapping table, under an example embodiment. For this example, storage tiers 1 and 2 provide SLA1 level storage, storage tier 7 provides SLA2 level storage, no tier provides SLA3 storage, and storage tier 3 provides SLA4 storage. The SLA terms for each SLA level (SLA1, 2, 3, etc.) are defined by the backup system and dictate a performance/cost/capacity characteristic of the storage system, such as SLA1=fast/expensive, SLA2=slow/cheap, SLA3=high availability, SLA4=cloud storage, and so on.

Files can be created with a backup_SLA attribute. Depending on the backup_SLA attribute of a file, the data and metadata of the file will be kept in the associated storage tiers. The backup_SLA can be specified at the time of create or can be an inherited attribute from an upper level directory. DDFS supports inheritable attributes where an attribute can be set on a parent directory and new files and subdirectories created in it will inherit the attribute. This would work well for the case where a backup_SLA is associated with a client that has an associated directory. A backup_SLA attribute can be set on the client's directory and every file or directory created in it will inherit the backup_SLA attribute. The files backup_SLA attribute is also stored in the file inode in file manager (FM). Looking at the backup_SLA mapping table in the domain, the list of tiers where the file data can be placed could be generated.

In a Santorini file system, similarity groups are formed by mapping certain sets of data are mapped to similarity groups. This mapping function could be based on a hash of some of the data spanned by the data. For example, it could be a selected fingerprint from the hundreds of L0 fingerprints in the L1, or it could be some of the bytes from the selected fingerprint. That selected value itself could be in a very large range, so the system maps it down to the range of similarity groups with a simple mod operator or other function.

In an embodiment, this amount of data for a similarity group comprises the data in an Mtree L1 layer. An L1 layer consists of hundreds of L0 fingerprints, and each L0 is about 8 KB, so an L1 spans about 4 MB of data. Other amounts of data are also possible to define similarity groups, but for this example every L1 is mapped to a similarity group.

In an embodiment, there are 1024 similarity groups per tier, though other numbers are also possible. This amount of file data (e.g., 'an L1's worth') is examined by the access object service to generate a similarity group ID, and the tier_ID list for that file and the similarity group ID is used to decide where the data needs to be sent for backend processing where deduplication takes place. The assignment of an L1 to a backend is based on both properties of the L1, the similarity group ID (simgroupID) and the SLA, which corresponds to a tier list that meets the SLA, such as shown in Table 802.

One option is for each <simgroupID, tierID> to be managed by different backends, but this would require distributing the L1s data to multiple backend nodes. Instead, embodiments of system 100 of FIG. 1 include a backend node 120 that is responsible for all tiers within the domain. This can be expressed as: <simgroupID, ANY_TIER_ID>. This means that the same node will own the same similarity group ID for all tiers.

Figure 9:
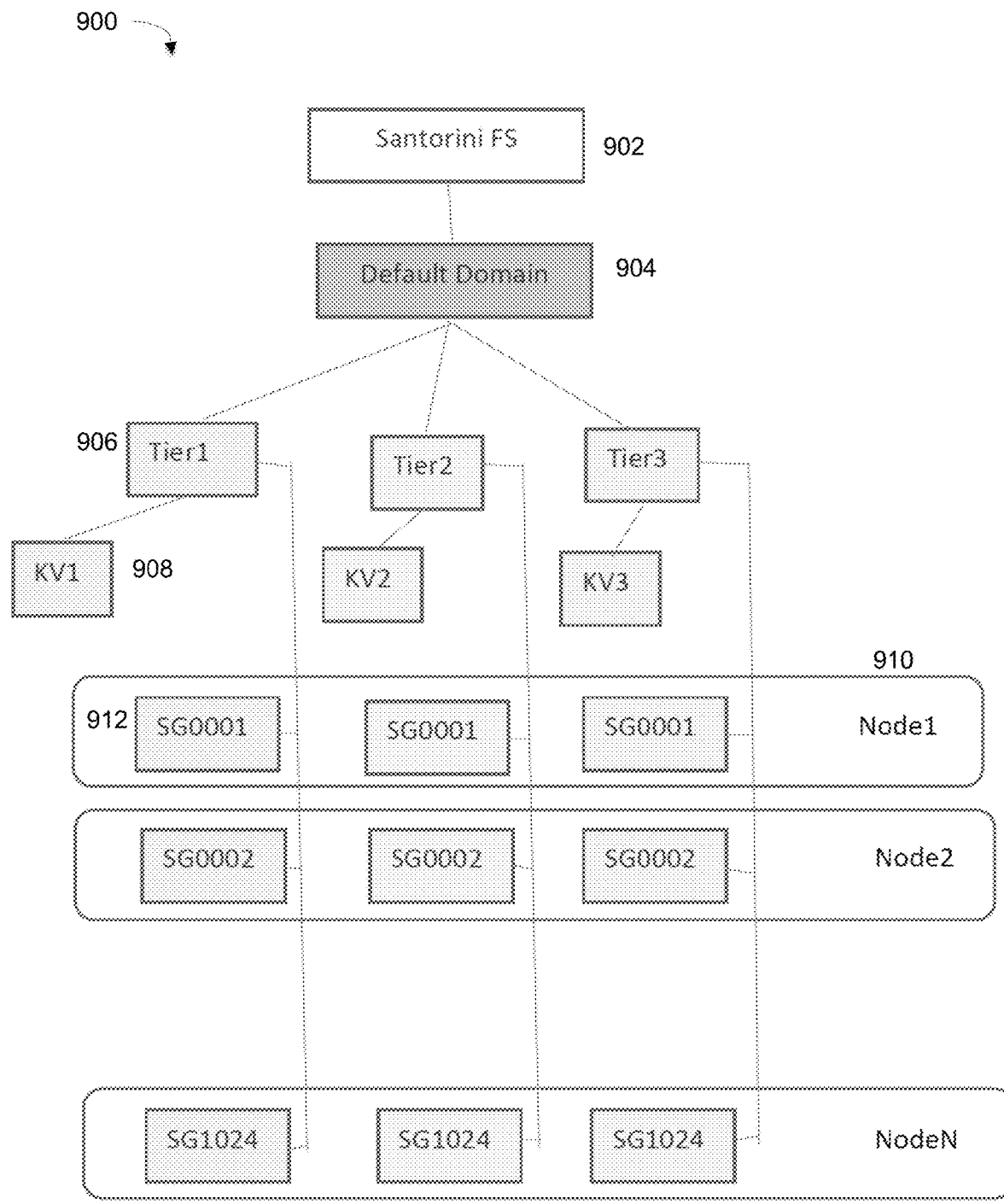
FIG. 9 shows an example distribution of similarity groups of multiple tiers among the deduplication and compression services in a single domain, under some embodiments.

FIG. 9 shows an example distribution of similarity groups of multiple tiers among the deduplication and compression (Dedup and Compress) services in a single domain, under some embodiments. System 900 includes the Santorini file system 902 and one domain (default domain) 904. This domain has three tiers 906 (Tier1, Tier2, and Tier 3), each with its own respective key-value store, 908. The Dedup and Compress service is shown as nodes 910 (Node1, Node2, Node3) in the system 900. Each node 910 has a set of similarity group IDs (SG000x), as shown, with each node owning the same SG number for all tiers, as mentioned above. Thus, as shown Tier1 comprises SG0001, SG0002, to SG1024 from Node1 to NodeN, Tier2 comprises SG0001, SG0002, to SG1024 from Node1 to NodeN, Tier3 comprises SG0001, SG0002, to SG1024 from Node1 to NodeN, and so on.

Deduplication works by comparing the list of fingerprints in a L1 to the fingerprints already stored for the assigned simgroup (SG) and each tier. This means that there is a separate key value store 908 for each <simgroupID, tierID>, so that deduplication is performed within that <simgroupID, tierID> and does not span tiers for the similarity group.

With this optimization, once the access object service (AoB) 506 generates a similarity group ID (simgroupID), it just needs to pass the data and the tier_ID list to the backend node 120 that owns the similarity group. If there are multiple tiers in the tier_ID list, the deduplication processing across these tiers will be local to the node. This integrated solution provides that, since the backup_SLA will have only one tier, the tier list passed to the backend node will have only one entry.

FIG. 9 illustrates the hierarchy between the Santorini FS 902, domains 904, tiers 906, and similarity groups 912. The default domain has three tiers, each with its own key value store. Similarity groups 1-1024 are shown (SG #), and each node has three versions of the similarity group, one per tier so that deduplication happens within a <simgroupID, tierID>. While only one similarity group ID is shown per node, nodes will tend to have upwards of hundreds of similarity groups, depending on the number of nodes in the domain.

Figure 10:
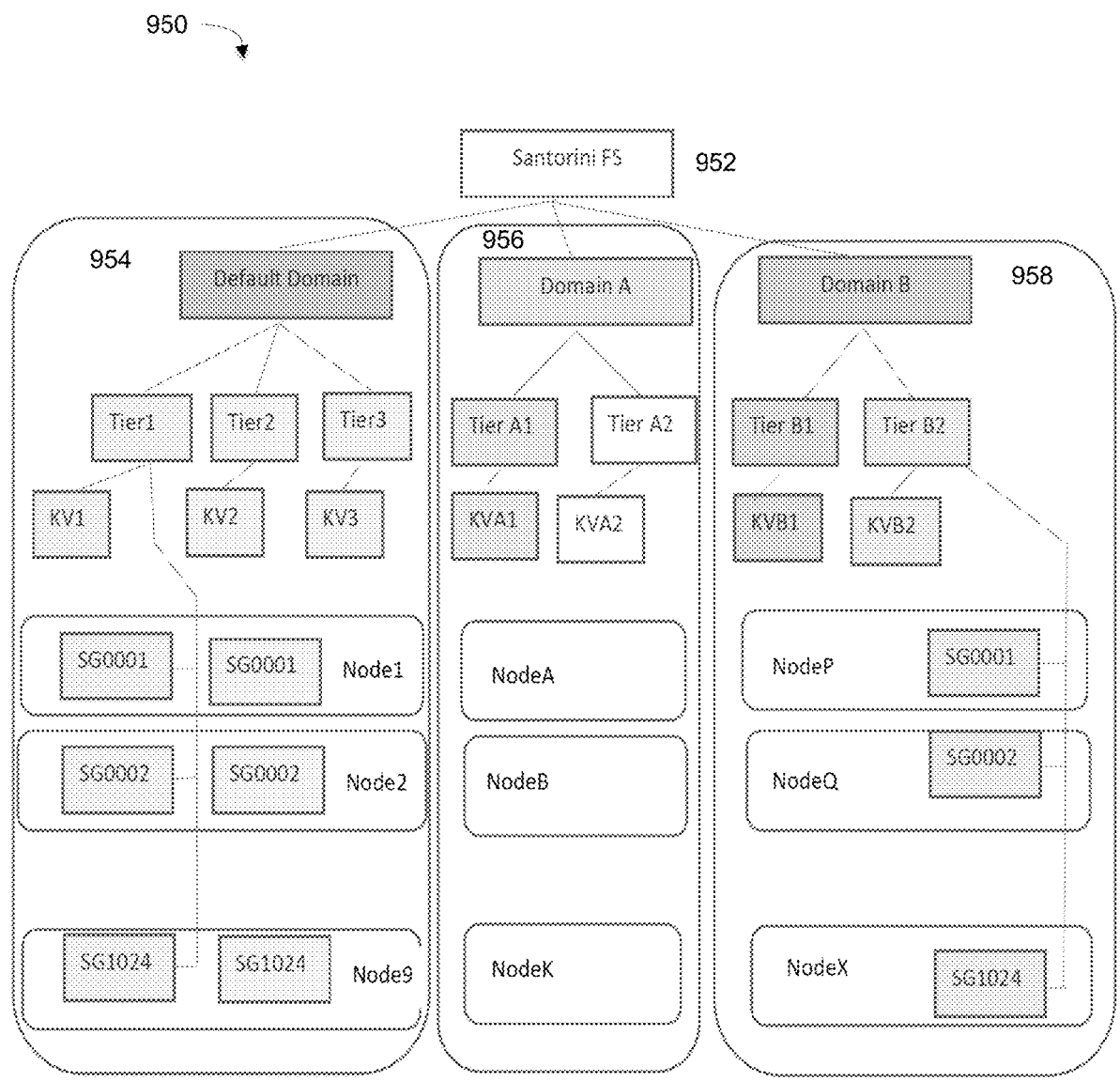
FIG. 10 shows an example distribution of similarity groups of multiple tiers among the deduplication and compression services in multiple domains, under some embodiments.

FIG. 9 illustrates a file system to domain hierarchy for a single domain example. Such a system can be extended to any number of domains. FIG. 10 shows an example distribution of similarity groups of multiple tiers among the Dedup and Compress services in multiple domains, under some embodiments. For this example, the Santorini filesystem 952 has three domains 954, 956, 958, as denoted "Default Domain," "Domain A," and "Domain B." Each domain has multiple tiers, and each tier has its own key value store used for deduplication and the storage of metadata for that tier. Nodes have one similarity group instance (SG000x) per tier. With this architecture of domains having tiers and each tier having its own KV store space, by allocating storage tiers and KV store from the appropriate nodes, most of the domain related logic can be hidden from the file system data path.

With reference back to FIG. 9, Tier1, Tier2, Tier3 would be object stores allocated from nodes that were in the default domain, as the only domain. Similarly, KV1, KV2, KV3 will be key value stores allocated from the nodes in the default domain. As files are ingested in this tier, the corresponding file data will be kept in the tier pointed to by the backup_SLA of the file. Similarly, the metadata would be stored in the KV store pointed to by the tier. Any namespace metadata will get stored in the KV store for the default tier in the domain. By configuring the KVs store and the object store from appropriate nodes in the domain, most of the domain configuration can be hidden from the backup/restore path.

This architecture essentially provides a system that presents a single global namespace for multiple domains in a cluster, yet limits the impact of any failures to nodes within an individual domain.

Figure 11:
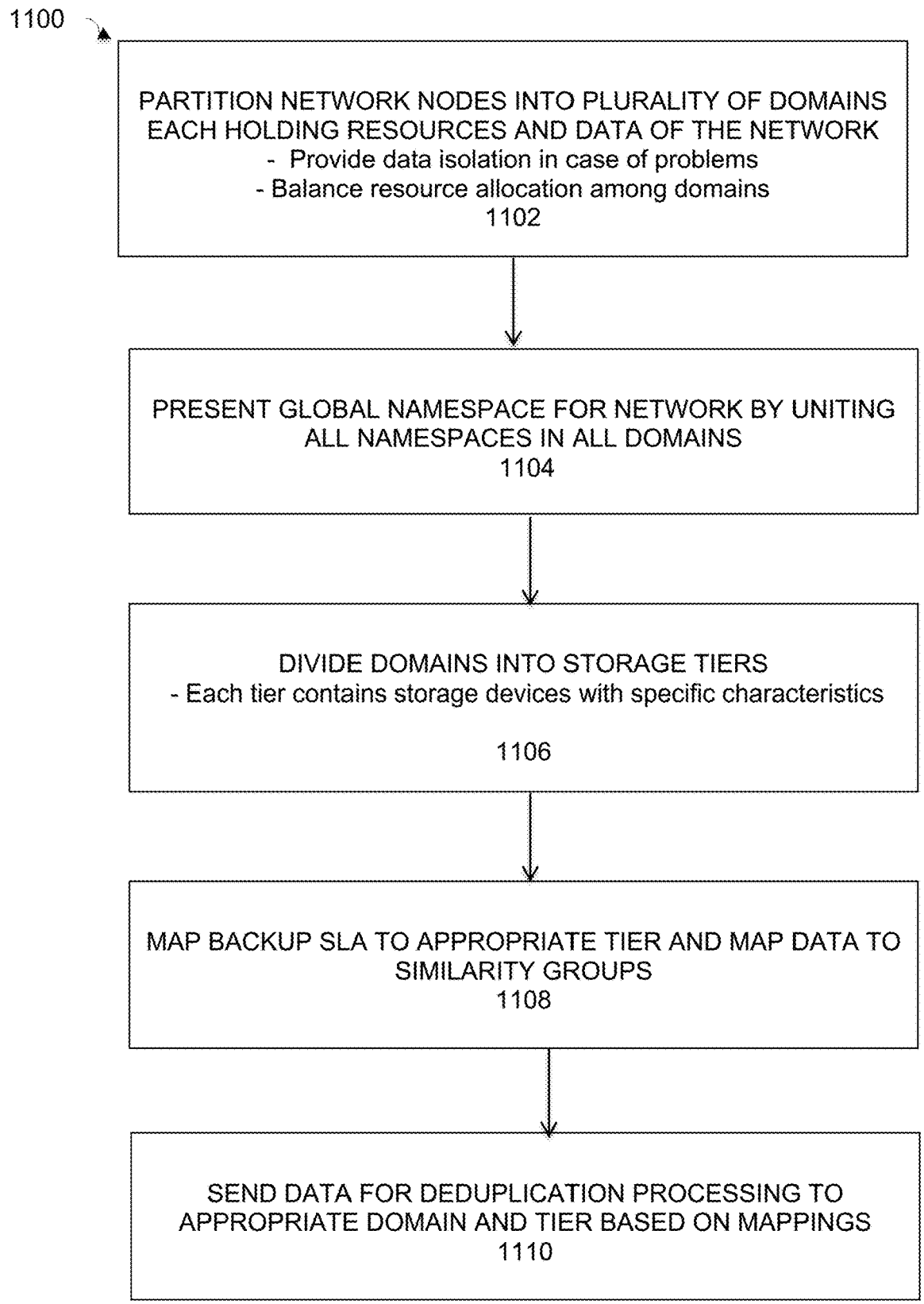
FIG. 11 is a flowchart that illustrates an overall method of partitioning a clustered network into a multi-domain and multi-tier network, under some embodiments.

FIG. 11 is a flowchart that illustrates an overall method of partitioning a clustered network into a multi-domain and multi-tier network, under some embodiments. In this process a clustered network is first partitioned into a number of separate domains, each containing resources (CPU, storage, etc.) and data/metadata represented by a namespace (Mtree), 1102. The use of individual domains provides isolation of data and resources in the event of issues or unavailability of nodes, data, or resources. It also allows for balancing of resources in the system by redirecting to different domains, as needed. A single global namespace for the entire network is presented to a user by combining (uniting) all of the namespaces in the domains, 1104.

The domains are next divided into individual storage tiers, 1106. Each tier contains storage devices or media (e.g., HDD, SSD, Flash, etc.) having specific performance, availability, and cost characteristics. The system then associates (maps) each storage with a backup SLA (backup SLA), and it also maps the data (e.g., L1 data) to similarity groups, 1108. These mappings are then used to send data for deduplication processing to the appropriate tier within a domain or domains, 1110.

The overall process 1100 of FIG. 11 illustrates general steps or producing a multi-domain and multi-tier system from an overall clustered network. Further process details for each of the main steps of multi-domain organization and multi-tier organization will be provided in FIGS. 12A and 13 below.

Figure 12A:
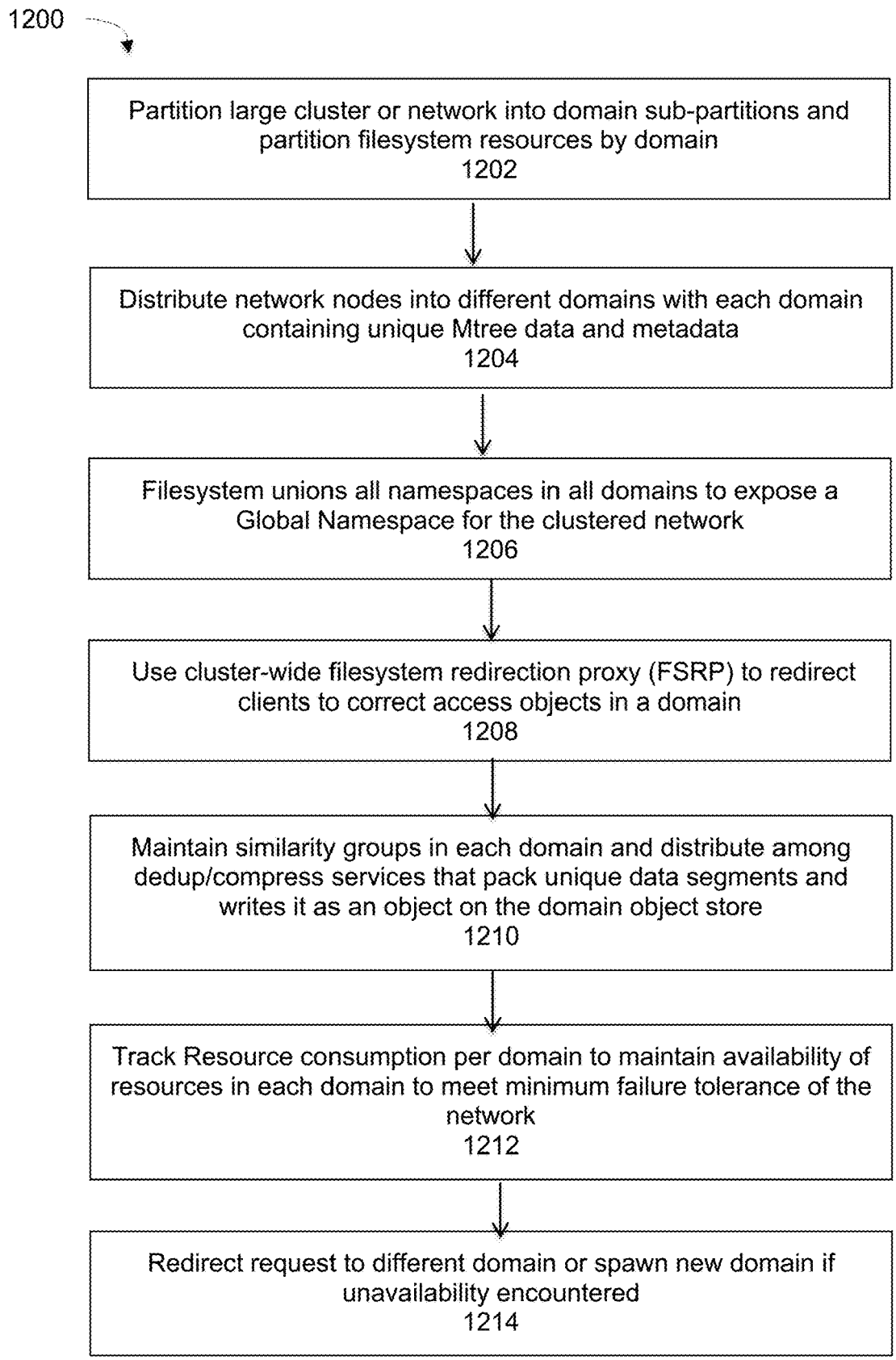
FIG. 12A is a flowchart that illustrates a method of providing a global namespace and damage minimization through a multi-domain clustered network, under some embodiments.

For the multi-domain embodiment, FIG. 12A is a flowchart that illustrates a method of providing a global namespace and damage minimization through a multi-domain clustered network, under some embodiments. Process 1200 of FIG. 12A begins by partitioning a larger cluster, or the entire clustered network into a number of domain sub-clusters or partitions, 1202. The user Mtrees are then distributed across these multiple domains and file system resources are partitioned by domain so that an problem in one domain will not affect data in other domains. Domains are created by the user by distributing nodes in the clustered network into individual domains, where each node is placed in only one domain, 1204. Domains can be denoted in any appropriate manner, and in a Santorini file system, the domains are organized into a default domain and additional indexed domains (e.g., A, B, C, etc.). Each domain contains namespace metadata as well as the file data and metadata associated with a unique Mtree allocated from resources owned by that domain.

The filesystem then exposes a global namespace that is a union of all namespaces in all domains, 1206.

A cluster-wide service, such as the File System Redirection Proxy (FSRP) is used to redirect client requests to the correct access object (AoB) in a domain, 1208. The FSRP is implemented as a cluster-wide resource meaning that it has multiple instances and uses resources from more than one domain in the cluster so it can survive a domain failure.

Each domain has a set of Dedup and Compress services, and process 1200 maintains for each domain, a set of similarity groups that are distributed among the Dedup and Compress services, 1210. Each domain has a set of object stores that are allocated from the nodes in that domain, and the Dedup and Compress service packs unique data segments for writing as an object in the object store in the domain.

As each domain has resources (e.g. CPU, memory, storage, KV-stores, etc.), the resource consumption is tracked per domain so that the system can maintain an availability of resources to meet failure tolerances (e.g., Santorini FTT) of the network, 1212. If any such unavailability is encountered, the system can be configured to redirect requests to other domains or spawn new domains. In an embodiment, this comprises sharding the data across the nodes and distributing the metadata accordingly. It may also comprise alerting the PPDM backup software to redirect file writes to functioning domains.

Migration Across Domains

In an embodiment, the multi-domain aspect supports maintaining a single namespace across multiple domains, as a global namespace. For this embodiment, certain processing logic in the client is only aware of the namespace, while an administrator can define the domains and move files around based on load balancing requirements/concerns or other properties. This allows for the ready migration and/or replication of data across domains. When a client creates an Mtree, the Santorini cluster determines the domain in which to place it, and an analytics engine provides analytics-driven data migration among the various domains within the single namespace.

Figure 12B:
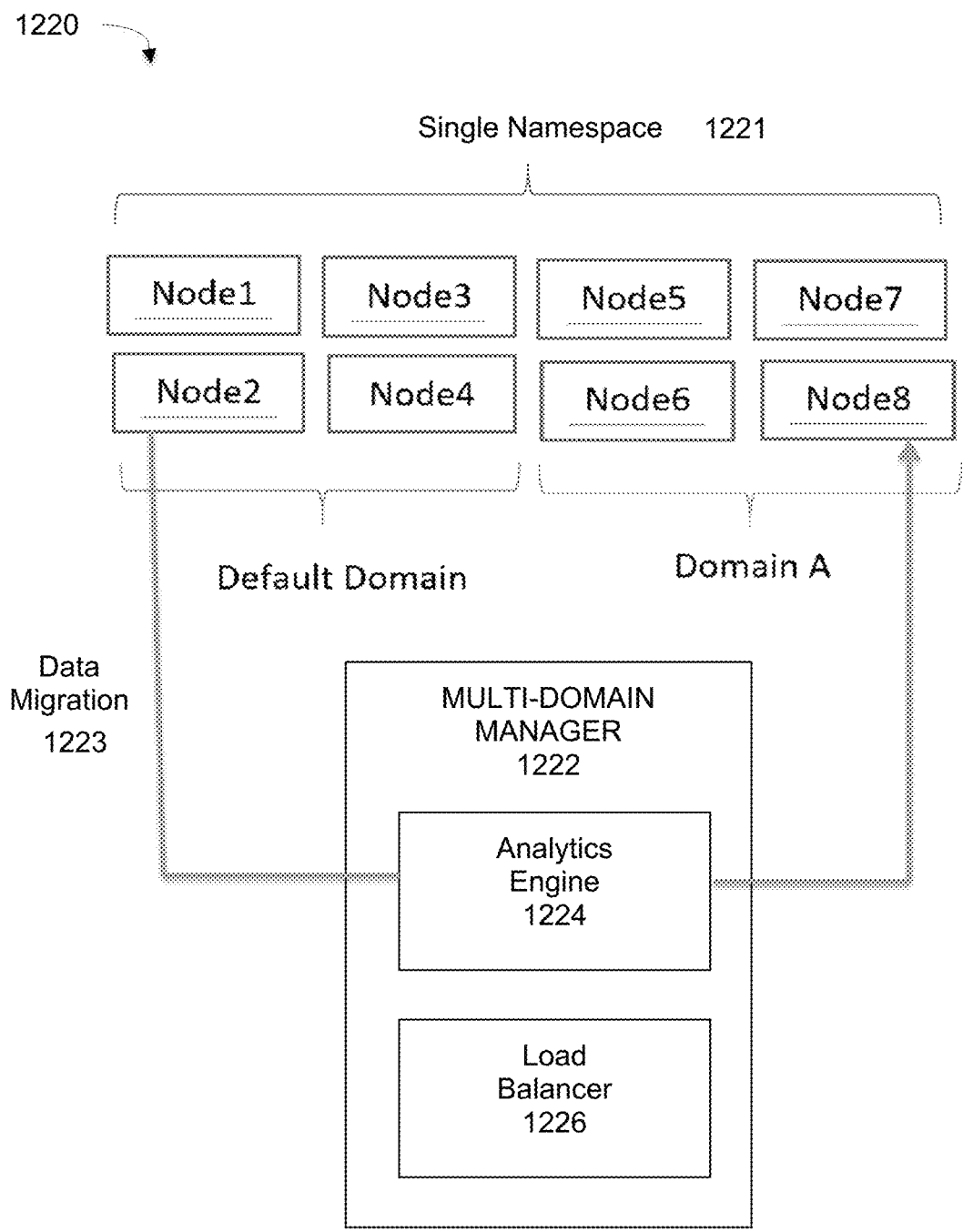
FIG. 12B illustrates a multi-domain management system providing analytics-based data migration and sustainability-based load balancing, under some embodiments.

FIG. 12B illustrates a multi-domain management system providing analytics-based data migration and sustainability-based load balancing, under some embodiments. As shown in FIG. 12B, system 1220 comprises a number of nodes organized into two or more domains, such as a default domain and any number of additional domains like domain A, etc. As described above, the namespaces of the domains are combined so that the system presents a single global namespace 1221 for the network to present to a user or backup process.

In an embodiment, a multi-domain manager component 1222 manages the migration 1223 of data among nodes in different domains. An analytics engine 1224 performs certain analysis operations on defined data and parameters to provide analytics driven migration across the domains. For this embodiment, the Data Domain system 100 features analytics-driven migration of Mtrees for global scale networks. The system determines which Mtrees to move around for better capacity usage and deduplication balancing.

In an embodiment, an analytics engine uses a similarity index to migrate (re-distribute) files in the cluster network to save the amount of deduplication storage needed. For this embodiment, a plurality of file cluster candidates are generated for a plurality of files stored at a multi-node storage system comprising a plurality of data nodes. Each of the plurality of file cluster candidates comprises some of the plurality of files. A similarity index is determined for each of the plurality of file cluster candidates based on similarity of the files comprised in the file cluster candidate. A ranked recipe list comprising a plurality of recipes is generated. Each recipe is associated with one of the plurality of file cluster candidates, comprises a destination data node for the associated file cluster candidate, and is associated with a deduplication space savings determined based on a total file size and the similarity index of the associated file cluster candidate. The plurality of recipes in the ranked recipe list are sorted based on data movement cost-adjusted deduplication space savings. At least some of the plurality of files are moved between the plurality of data nodes based on the recipes in the ranked recipe list to improve deduplication space savings in the multi-node storage system. File movements based on highest ranked recipes in the ranked recipe list are performed first.

The similarity can be defined for a file, or a group of files. In the case of a file, the segment fingerprints of that file are utilized, and in the case of a group of files, the union of the fingerprints of all the file in the group is utilized. The unit of "movement" is a tag, i.e., a group of files with the same 64-bit ID. Therefore, similarity is applied to a tag of files. The process is to identify groups of tags that are similar and to place them on the same node to get optimal deduplication. In one embodiment, each of the plurality of files is associated with a tag. The tag may be indicative of a source of the file. In one embodiment, each file cluster candidate comprises all files associated with one or more of the tags. In one embodiment, the similarity index comprises a Jaccard index.

Determining the data movement cost-adjusted deduplication space savings associated with a recipe comprises dividing the deduplication space savings associated with the recipe by a quantity of files that need to be moved. Alternatively, determining the data movement cost-adjusted deduplication space savings associated with a recipe comprises dividing the deduplication space savings associated with the recipe by an amount of data that need to be moved.

Each of the plurality of data nodes is associated with a storage size limit. A third recipe in the ranked recipe list is ignored, invalidated, or removed when moving all files in the file cluster candidate associated with the third recipe to the destination node of the third recipe would cause a violation of the storage size limit of the destination node. Any file cluster candidates whose similarity indexes are below a threshold are discarded, and are not included in the ranked recipe list.

A process of redistributing files in a multi-node storage system to improve global deduplication storage savings may be performed by processing logic that includes hardware (e.g. circuitry, dedicated logic, etc.), software (e.g., embodied on a non-transitory computer readable medium), or a combination thereof.

Although embodiments of the domain data migration process are described with respect to similarity index-based analysis, embodiments are not so limited. Other embodiments may utilize migration plans based on greedy iterative processes, integer linear programming (ILP) algorithms, hierarchical clustering, and so on.

Sustainability-Based Load Balancing

In an embodiment, the Data Domain system has the capacity balancing where it can move data between different deduplication domains. The capacity balancing algorithm in DD filesystem finds similar datasets and moves them between different nodes to balance capacity. This same technique can be used to migrate datasets between domains to balance capacity and perform deduplication operations.

As shown in FIG. 12B, embodiments provide a multi-domain management system that also enables sustainability-based load balancing for operating resources such as power and cooling, as well as processor/memory use. For this embodiment, multi-domain manager 1222 includes a load balancer component 1226. The state of the nodes within each domain are monitored with respect to their operational characteristics, such as power consumption, operating temperature, stress/overload conditions, and so on. If any node or nodes are detected as being operating outside of any defined tolerances, the multi-domain manager 1222 can migrate data and operations to one or more other nodes to relieve the usage and pressure on any over-stressed nodes. Especially with respect to power consumption and cooling requirements, this provides load balancing functionality with respect to sustainable power usage and environmental concerns.

Additional load balancing functions can be provided to more efficiently perform backup/restore, and other application processes. For example, in an embodiment, two or more nodes in the clustered network 100 can be co-located so that they share at least some resources. In this way, these nodes can save resource overhead (e.g., processor cycles, memory, I/O interfaces, etc.) to reduce power consumption, heat generation, cooling requirements, space requirements, and so on. For this embodiment, one or more feedback loops or paths may be provided between the nodes and load balancer 1226 of FIG. 12B.

Figure 13:
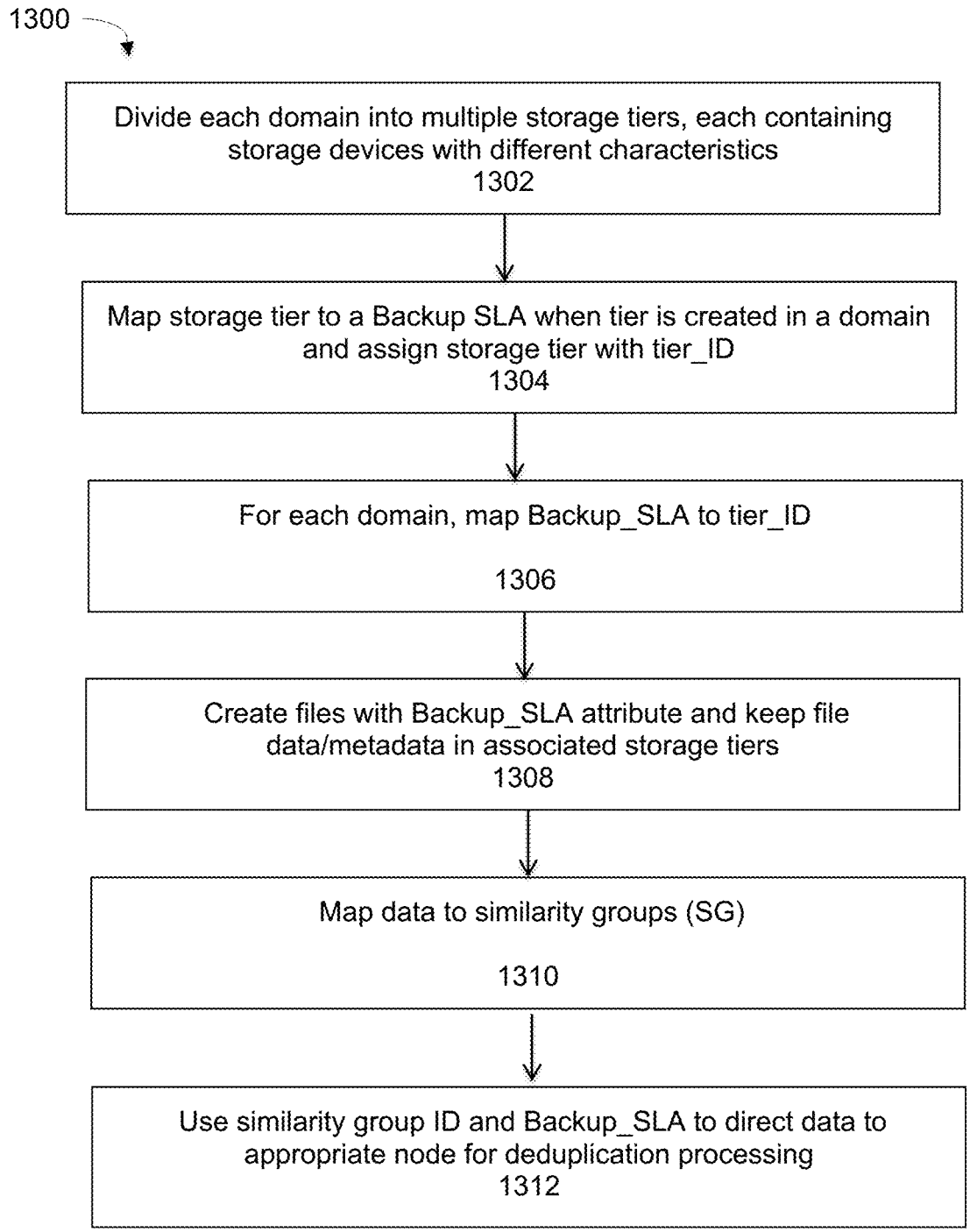
FIG. 13 is a flowchart that illustrates a method of dividing a multi-domain network into a multi-tier system, under some embodiments.

For the multi-tier embodiment, FIG. 13 is a flowchart that illustrates a method of dividing a multi-domain network into a multi-tier system, under some embodiments. As stated above, domains contain network resources including storage media that can meet certain service level objectives (SLO) such as latency, throughput, and cost. Process 1300 first divides each domain into multiple storage tiers to differentiate storage within the domain to these different characteristics, 1302.

Corresponding to the user SLOs, network providers or vendors provide resources based on service level agreements (SLAs) to ensure at least a minimum amount of resources and support to meet these SLOs. In a backup system, each storage tier is associated with a backup SLA (Backup_SLA), and a storage tier is mapped to a backup SLA when the tier is created in a domain, and each storage tier is assigned an integer value tier_ID, 1304.

The backup_SLAs are defined across domains, so for each domain, a Backup_SLA is mapped to a tier_ID through a mapping table that gives the tier_ID list for the Backup_SLA for that domain, 1306. This yields a system-wide mapping of storage tier to tier_ID and a per domain mapping of a Backup_SLA to tier IDs.

Files are created with or inherit a backup_SLA attribute, and depending on the backup_SLA attribute of a file, the data and metadata of the file is then stored in the associated storage tier or tiers, 1308. A set of data (e.g., set of L1 data) is then mapped to a similarity group, 1310.

The similarity group ID and the Backup_SLA attribute of a file is then used to direct the data to the appropriate node or resource for deduplication processing, 1312. The assignment of a dataset to a particular node is based on both properties of the data (Backup_SLA attribute), the similarity group ID and the SLA, which corresponds to a tier of a domain that meets the SLA.

Embodiments described above organize a clustered network into a multi-domain multi-tier network in which the multi-domain architecture provides a single namespace across all domains. The system or storage administrator can choose where to place portions of the namespace at creation time, and backup systems/personnel see a single namespace across all domains. The multi-domain architecture also provides file redirection using Mtree mechanisms to determine the domain and the file handle to direct data within a domain. This is unlike other systems that only route data based on Mtree to a node. Embodiments also employ protocol level differences in the redirection.

The multi-tier architecture optimizes the domain/node layout to support files that can span multiple tiers to achieve the best deduplication while meeting the SLA requirements. Once the similarity group ID is determined and the data routed to the corresponding backup set, all of the deduplication processes take place within that node. This avoids remote procedure calls (RPCs) to other nodes, and even if multiple tiers for that similarity group are considered, calculations are local to a single service. The multi-tier architecture also optimizes moving (migrating) files from one tier to another tier because the same service is responsible for both tiers for each similarity group ID. This reduces latency during movement and network congestion.

Deduplication Options with Multiple Tiers

The embodiments described above covered how L1 data is stored within a tier and deduplicated against a single <simgroupID, tierID>. In other embodiments, multiple <simgroupID, tierID> groups can be used.

One such embodiment is to track the tier placement per file. This gives the restriction that a file cannot span tiers. In this case, the system places the file in one of the tiers referenced by the backup_SLA. Once the file is placed in a tier, all data ingest will be done on that tier. If the backup_SLA has only one tier, this option works well enough, however, if the backup_SLA has multiple tiers, this might cause poor deduplication performance and will generate issues with free space pooling. This is because multiple versions of the same file could be placed in different tiers and lose potential deduplication hits when duplicates are on different tiers. Furthermore, one tier may become fuller than other tiers within the backup_SLA. In order to free up space in a tier, therefore, an entire file needs to be deleted or migrated to a different tier.

An alternative embodiment is to track the tier per L0 segment. This would provide the best deduplication performance, but a file's segments would be scattered across all of the tiers that meet the SLA, which can harm performance as less useful data can be prefetched with a single I/O. It will also generate more metadata as tier information needs to be tracked per L0. Garbage collection also becomes more complicated since tracking will need to be handled at the segment and tier level.

A further alternative embodiment involves tracking the tier placement per L1 entry. Here an L1's worth of data could be considered against multiple tiers in the tier_ID list, and the L1's segments could be placed in the tier that provides the best or optimum deduplication performance. The L2 data will have a list of <L1 FP, simgroupID, tierID>. Since the file could span multiple tiers, this solves the free space pooling issue as well. There may well be some potential deduplication loss as some of the L0s may be present in other tiers and since an entire L1 set of data is placed in a tier, this will create some duplicates across tiers.

Figure 14:
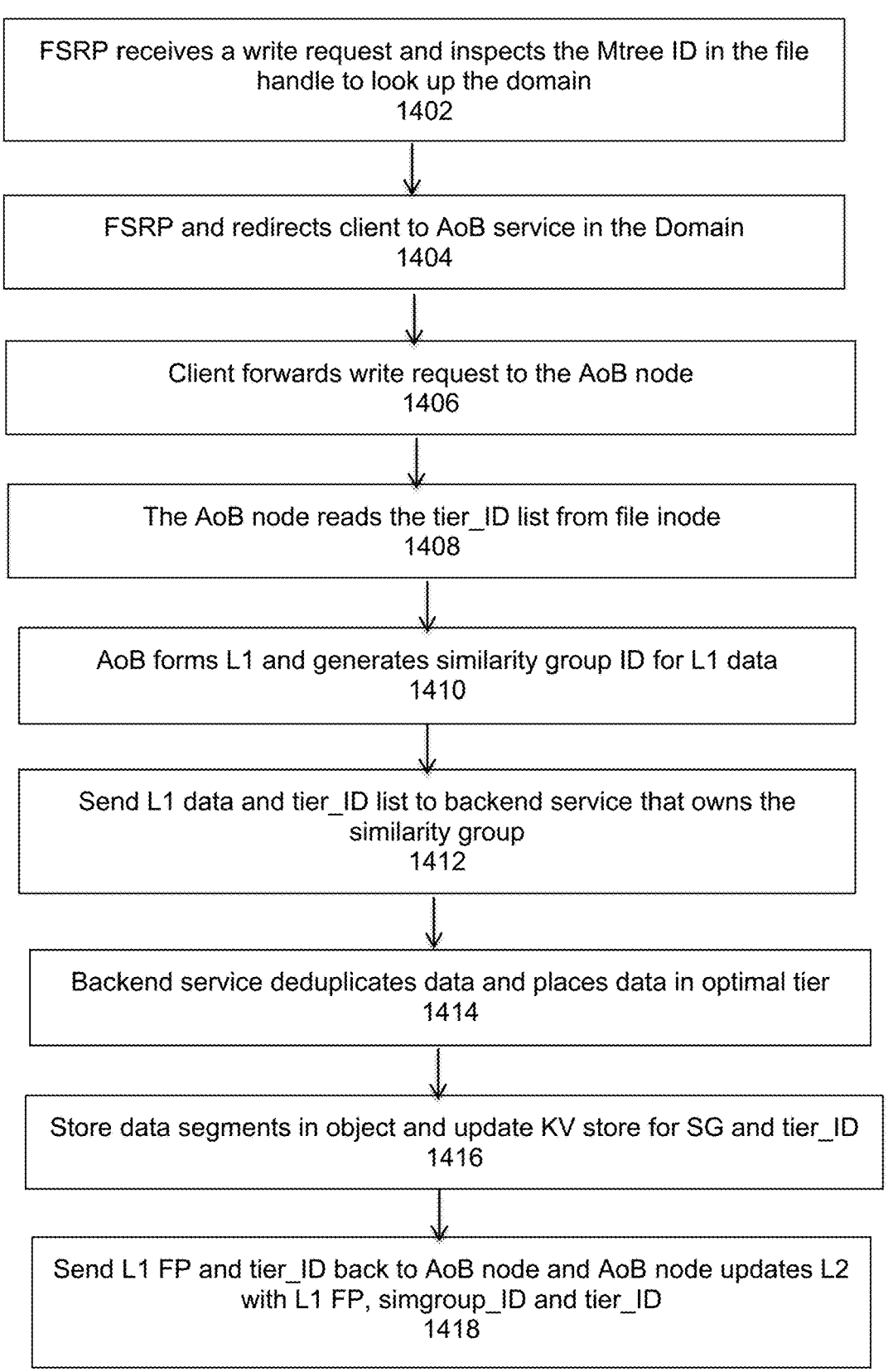
FIG. 14 is a flowchart that illustrates a method of performing data deduplication by tracking tier placement per L1 entry for a write operation, under some embodiments.

FIG. 14 is a flowchart that illustrates a method of performing data deduplication by tracking tier placement per L1 entry, under some embodiments. FIG. 14 illustrates a process 1400 for a write operation. As shown in FIG. 14, process 1400 starts with the FSRP receiving a write request and inspecting the Mtree ID (MID) in the file handle to lookup the domain for the MID, 1402. Once found, the FSRP redirects the client to one of the AoB services in that domain, 1404. The client forwards the write request to the AoB node, 1406, and the AoB node reads the tier_ID list from the file inode, 1408. The AoB then forms an L1 dataset and generates the similarity group ID for the L1 data, 1410.

The data for the L1 along with the tier_ID list is sent to the backend service that owns the similarity group, 1412. The backend service deduplicates the data and places the data in the tier that has optimal deduplication performance for this data, 1414. This optimization can be an iterative process that starts as a simple technique and improve over time, among other possible optimizations. The data segments are stored in an object that will be written to the appropriate tier. The key value store for that similarity group and tier_ID is then updated, 1416. The L1 fingerprint and the tier_ID where it is stored is sent back to the AoB node, and the AoB node updates the L2 with the L1 FP, simgroupID, and tier_ID, 1418.

FIG. 14 illustrates a process for a write operation. FIG. 15 is a flowchart that illustrates a method of performing data deduplication by tracking tier placement per L1 entry for a read operation, under some embodiments. As shown in FIG. 15, process 1500 begins with the FSRP receives a read request and inspecting the MID in the file handle to look up the domain for the MID, 1502. It then redirects the client to one of the AoB services in that domain, 1504, and the client forwards the read request to the AoB node, 1506. The AoB finds the L1 dataset for the offset being read, 1508. The L1 information includes the L1 FP, simgroupID and tier_ID. The AoB sends the read request along with the tier_ID information to the node that owns the similarity group, 1510. The backend node checks the key value store for that similarity group and tier_ID to determine the object (or partial object) to read from object storage, 1512.

Figure 16:
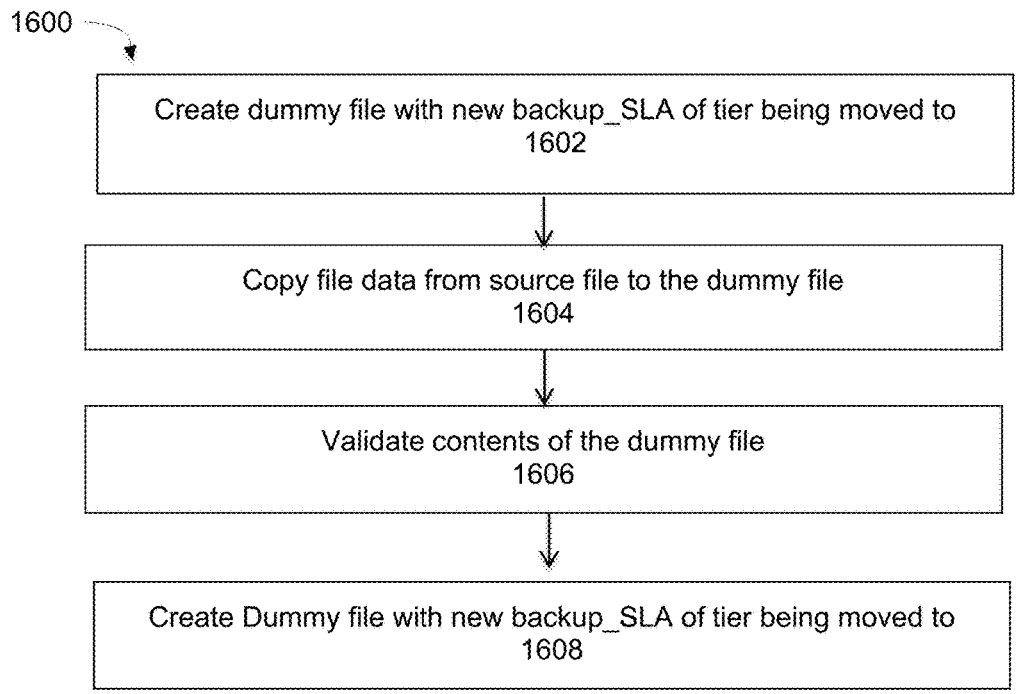
FIG. 16 is a flowchart that illustrates a process of performing a file migration in a multi-domain, multi-tier clustered network, under some embodiments.

Embodiments can also be used for file migration operations. Thus, once the file is ingested, it could be migrated to a different tier. FIG. 16 is a flowchart that illustrates a process of performing a file migration in a multi-domain, multi-tier clustered network, under some embodiments. Process 1600 of FIG. 16 starts with creating a temporary (dummy) file with the new backup_SLA, i.e., the backup_SLA of the tier being migrated to, 1602. The file data is then copied data from the source file to the dummy file, 1604. The process validates the contents of dummy file, 1606. The source inode is then modified with the content handle of the dummy file and the new backup_SLA, 1608.

This is generally similar to the process of file migration works in a DDFS system, but it features the benefit of validating a file before the source inode is switched to point to the new data.

In an alternative embodiment of process 1600, the system sets the backup_SLA that points to the new tier in which the file has to be migrated, and for every L1 that is on the wrong tier, it migrates the L1's worth of data to the new tier.

As stated above, as the number of nodes in the cluster grows, the chances increase of the system experiencing more than two node or two drive failures (for an example Santorini FTT). Thus, as the cluster size grows, the chance that there is failure of more than two nodes or disks (assuming FTT=2) increases. This results in two costs (1) iterating the file system metadata to check if there is a data loss, and (2) the amount of data loss.

If the probability of a node/disk failure is X the probability of seeing three disk/node failure on a cluster of membership n is $nP3X^3$, where n is the number of nodes. The probability is calculated for node failures or the number of disks if the probability is calculated for disk failures. This increases as n goes up.

The probability that a given three nodes/disks will fail on the cluster is $1/nC3*X^3$. This decreases as n goes up.

Since the system is sharding across nodes and distributing the metadata, there is a probability that for a given three nodes/disks, one shard is stored in them. If the sharding is very efficient, every three disks/nodes will own some shard. In this case, the probability of data loss on a three disk/node failure will be close to the $nP3X^3$ probability. If the systems shards less perfectly, such as all metadata is only on the nodes/disks, the probability of data unavailability is closer to $1/nC3*X^3$. Typical situations will likely fall somewhere in between these two probabilities calculations.

It is reasonable to shard to maximize the node/disk throughput and the number of shards is large so that every node/disk will get roughly an equal amount of metadata, which might tilt this probability more toward $nP3X^3$.

One cost that needs to be considered is that any time we see that there are two or more failures, the system needs to iterate the FS metadata to check if it lost anything. Once it is seen that there is an unavailability, there is a cost in scanning the file system to identify the affected files. These depend on the size of the cluster, and reducing the cluster size by implementing domains as described herein minimizes the cost in this case.

Figure 17:
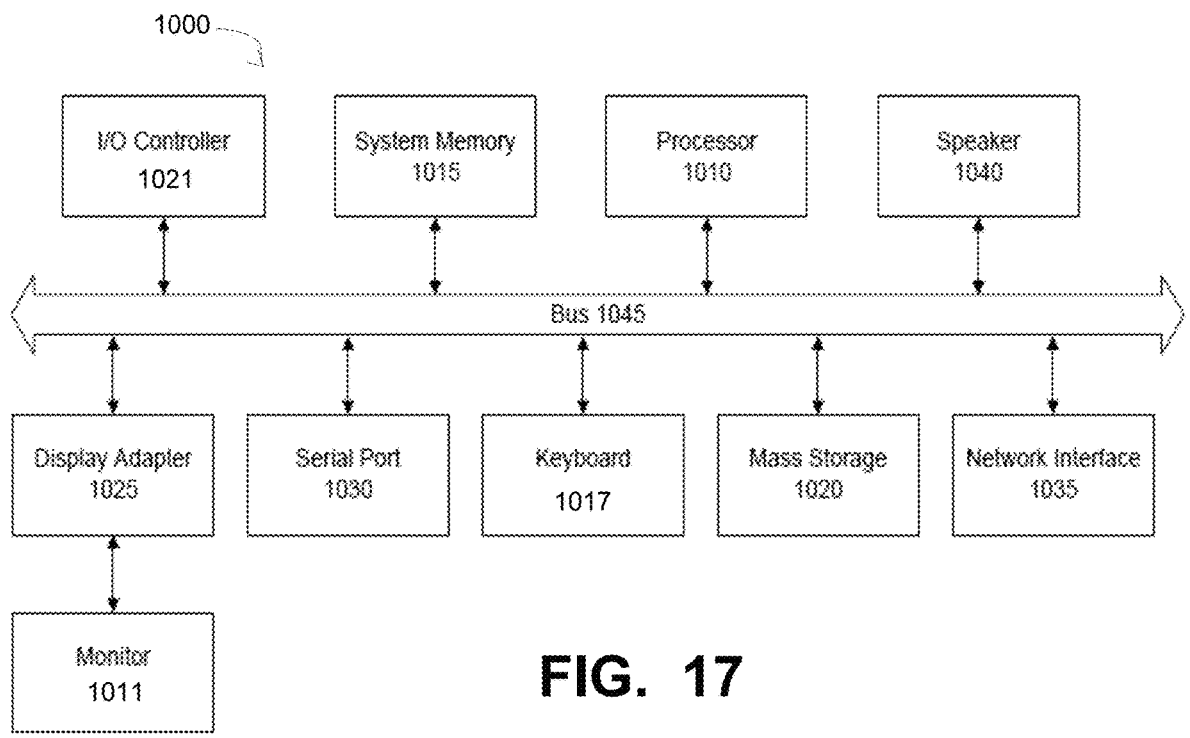
FIG. 17 is a block diagram of a computer system used to execute one or more software components of an event injection process for simulating error conditions in a distributed system, under some embodiments.

FIG. 17 is a block diagram of a computer system used to execute one or more software components of a service scaling process for distributed systems, under some embodiments. The computer system 1000 includes a monitor 1011, keyboard 1017, and mass storage devices 1020. Computer system 1000 further includes subsystems such as central processor 1010, system memory 1015, input/output (I/O) controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1000. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1000 is an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software. An operating system for the system may be one of the Microsoft Windows®. family of systems (e.g., Windows Server), Linux, Mac™ OS X, IRIX32, or IRIX64. Other operating systems may be used.

Although certain embodiments have been described and illustrated with respect to certain example network topographies and node names and configurations, it should be understood that embodiments are not so limited, and any practical network topography is possible, and node names and configurations may be used.

Embodiments may be applied to data, storage, industrial networks, and the like, in any scale of physical, virtual or hybrid physical/virtual network, such as a very large-scale wide area network (WAN), metropolitan area network (MAN), or cloud-based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network. The network may comprise any number of server and client computers and storage devices, along with virtual data centers (vCenters) including multiple virtual machines. The network provides connectivity to the various systems, components, and resources, and may be implemented using protocols such as Transmission Control Protocol (TCP) and/or Internet Protocol (IP), well known in the relevant arts. In a distributed network environment, the network may represent a cloud-based network environment in which applications, servers and data are maintained and provided through a centralized cloud-computing platform.

Some embodiments of the invention involve data processing, database management, and/or automated backup/recovery techniques using one or more applications in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Although embodiments are described and illustrated with respect to certain example implementations, platforms, and applications, it should be noted that embodiments are not so limited, and any appropriate network supporting or executing any application may utilize aspects of the backup management process described herein. Furthermore, network environment 100 may be of any practical scale depending on the number of devices, components, interfaces, etc. as represented by the server/clients and other elements of the network. For example, network environment 100 may include various different resources such as WAN/LAN networks and cloud networks 102 are coupled to other resources through a central network 110.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of facilitating data migration in a multi-domain network, comprising:

partitioning a clustered network into a number of separate domains, wherein each domain contains resources including processors, memory, storage devices, as well as data deduplication and compression services, wherein the clustered network comprises a Santorini filesystem network that stores file system metadata in a distributed key-value (KV) store and file data in an object store;

presenting a single global namespace for the network is presented to a user or backup process by combining all of the namespaces in the domains;

providing a multi-domain manager component having an analytics engine to facilitate analytics-driven migration of data among nodes in different domain;

providing a plurality of storage devices in a multi-tier arrangement, wherein tiers of the multi-tier arrangement provide storage with different cost and performance characteristics to satisfy different service level agreement (SLA) requirements;

creating files comprising migrating data with a backup SLA attribute to map each file to a corresponding storage tier;

mapping the files to similarity groups through a hashing function based on a hash of some data spanned by the data of each of the files, each similarity group assigned a similarity group ID;

assigning an integer value tier ID to each tier, each having its own KV store; and performing a deduplicated migration operation within a single similarity group ID and tier ID KV pair so that deduplication does not span tiers for a similarity group.

2. The method of claim 1 wherein each domain contains data and metadata represented by a namespace in the form of a managed directory tree (Mtree).

3. The method of claim 1 further comprising: distributing nodes of the clustered network into different domains with each domain containing unique Mtree data and metadata.

4. The method of claim 3 further comprising migrating data among the nodes by re-distributing data files through one of similarity indexes, greedy iterative processes, integer linear programming (ILP) algorithms, hierarchical clustering processes.

5. The method of claim 1 wherein a similarity index is used, the method further comprising:
generating a plurality of file cluster candidates for the files, each of the plurality of file cluster candidates comprising some of the files;
determining a similarity index is determined for each of the plurality of file cluster candidates based on similarity of the files comprised in the file cluster candidate; and
generating a ranked recipe list comprising a plurality of recipes, wherein each recipe is associated with one of the plurality of file cluster candidates, comprises a destination data node for the associated file cluster candidate, and is associated with a deduplication space savings determined based on a total file size and the similarity index of the associated file cluster candidate.

6. The method of claim 5 further comprising:
sorting the plurality of recipes in the ranked recipe list based on data movement cost-adjusted deduplication space savings; and
moving at least some of the plurality of files between the plurality of data nodes based on the recipes in the ranked recipe list to improve deduplication space savings in the network, such that file movements based on highest ranked recipes in the ranked recipe list are performed first.

7. The method of claim 6 wherein the single global namespace is utilized by a deduplication backup system to backup and restore data as part of the migration from one or nodes in the clustered network.

8. A system for migrating data in a multi-domain network, comprising:
a clustered network partitioned into a number of separate domains, wherein each domain contains resources including processors, memory, storage devices, as well as data deduplication and compression services, wherein the clustered network comprises a Santorini filesystem network that stores file system metadata in a distributed key-value (KV) store and file data in an object store;
a single global namespace for the network presented to a user or backup process by combining all of the namespaces in the domains;
a multi-domain manager component having an analytics engine to facilitate analytics-driven migration of data among nodes in different domains;
a plurality of storage devices in a multi-tier arrangement, wherein tiers of the multi-tier arrangement provide storage with different cost and performance characteristics to satisfy different service level agreement (SLA) requirements, wherein files comprising migrating data are created with a backup SLA attribute to map each file to a corresponding storage tier;
a component mapping the files to similarity groups through a hashing function based on a hash of some data spanned by the data of each of the files, each similarity group assigned a similarity group ID, and assigning an integer value tier ID to each tier, each having its own KV store; and
a deduplicated backup server performing a deduplicated migration operation within a single similarity group ID and tier ID KV pair so that deduplication does not span tiers for a similarity group.

9. The system of claim 8 wherein each domain contains data and metadata represented by a namespace in the form of a managed directory tree (Mtree), the system further distributing nodes of the clustered network into different domains with each containing unique Mtree data and metadata.

10. The system of claim 9 further comprising an analytics engine facilitating migration of data among the nodes by re-distributing data files through one of similarity indexes, greedy iterative processes, integer linear programming (ILP) algorithms, hierarchical clustering processes.

11. The system of claim 10 wherein the analytics engine utilizes similarity index-based migration that:
generates a plurality of file cluster candidates for the files, each of the plurality of file cluster candidates comprising some of the files;
determines a similarity index is determined for each of the plurality of file cluster candidates based on similarity of the files comprised in the file cluster candidate; and
generates a ranked recipe list comprising a plurality of recipes, wherein each recipe is associated with one of the plurality of file cluster candidates, comprises a destination data node for the associated file cluster candidate, and is associated with a deduplication space savings determined based on a total file size and the similarity index of the associated file cluster candidate;
sorts the plurality of recipes in the ranked recipe list based on data movement cost-adjusted deduplication space savings; and
moves at least some of the plurality of files between the plurality of data nodes based on the recipes in the ranked recipe list to improve deduplication space savings in the network, such that file movements based on highest ranked recipes in the ranked recipe list are performed first.

12. The system of claim 11 wherein the clustered network comprises part of a deduplication backup system performing backup and restore operations as the data migration for the nodes.

* * * * *